United States Patent
Lei et al.

(10) Patent No.: US 9,466,292 B1
(45) Date of Patent: Oct. 11, 2016

(54) ONLINE INCREMENTAL ADAPTATION OF DEEP NEURAL NETWORKS USING AUXILIARY GAUSSIAN MIXTURE MODELS IN SPEECH RECOGNITION

(71) Applicant: Google Inc., Mountain View, CA (US)

(72) Inventors: Xin Lei, Sunnyvale, CA (US); Petar Aleksic, New York, NY (US)

(73) Assignee: Google Inc., Mountain View, CA (US)

( * ) Notice: Subject to any disclaimer, the term of this patent is extended or adjusted under 35 U.S.C. 154(b) by 518 days.

(21) Appl. No.: 13/886,620

(22) Filed: May 3, 2013

(51) Int. Cl.
*G10L 15/00* (2013.01)
*G10L 15/16* (2006.01)

(52) U.S. Cl.
CPC ..................... *G10L 15/16* (2013.01)

(58) Field of Classification Search
None
See application file for complete search history.

(56) References Cited

U.S. PATENT DOCUMENTS

| | | | | |
|---|---|---|---|---|
| 7,769,588 B2* | 8/2010 | Kompe | ............... | G10L 15/065 704/243 |
| 8,515,750 B1* | 8/2013 | Lei | ............... | G10L 15/26 379/88.01 |
| 8,554,559 B1* | 10/2013 | Aleksic | ............... | G10L 15/30 704/235 |
| 8,571,859 B1* | 10/2013 | Aleksic | ............... | G10L 15/07 704/231 |
| 8,983,844 B1* | 3/2015 | Thomas | ............... | G10L 15/30 704/226 |
| 2002/0087325 A1* | 7/2002 | Lee | ............... | G06Q 30/06 704/270.1 |
| 2002/0156626 A1* | 10/2002 | Hutchison | ............... | G10L 15/16 704/231 |
| 2003/0009333 A1* | 1/2003 | Sharma | ............... | G10L 15/04 704/246 |
| 2006/0235696 A1* | 10/2006 | Bennett | ............... | G06F 17/27 704/270.1 |
| 2008/0077404 A1* | 3/2008 | Akamine | ............... | G10L 15/065 704/243 |
| 2008/0255835 A1* | 10/2008 | Ollason | ............... | G10L 15/18 704/231 |
| 2008/0312926 A1* | 12/2008 | Vair | ............... | G10L 17/16 704/249 |
| 2008/0316888 A1* | 12/2008 | Reifman | ............... | H04M 1/575 369/69 |
| 2009/0216528 A1* | 8/2009 | Gemello | ............... | G10L 15/065 704/232 |

(Continued)

OTHER PUBLICATIONS

Frank Seide et al., Feature Engineering in Context-Dependent Deep Neural Networks for Conversational Speech Transcription, 978-1-4673-03657-5/11, 2011 IEEE (ASRU 2011).

(Continued)

*Primary Examiner* — Richemond Dorvil
*Assistant Examiner* — Thuykhanh Le
(74) *Attorney, Agent, or Firm* — McDonnell Boehnen Hulbert & Berghoff LLP

(57) ABSTRACT

Methods and systems for online incremental adaptation of neural networks using Gaussian mixture models in speech recognition are described. In an example, a computing device may be configured to receive an audio signal and a subsequent audio signal, both signals having speech content. The computing device may be configured to apply a speaker-specific feature transform to the audio signal to obtain a transformed audio signal. The speaker-specific feature transform may be configured to include speaker-specific speech characteristics of a speaker-profile relating to the speech content. Further, the computing device may be configured to process the transformed audio signal using a neural network trained to estimate a respective speech content of the audio signal. Based on outputs of the neural network, the computing device may be configured to modify the speaker-specific feature transform, and apply the modified speaker-specific feature transform to a subsequent audio signal.

20 Claims, 12 Drawing Sheets

(56) References Cited

U.S. PATENT DOCUMENTS

| | | | | |
|---|---|---|---|---|
| 2009/0287489 | A1* | 11/2009 | Savant | G10L 15/07 704/246 |
| 2010/0057453 | A1* | 3/2010 | Valsan | G10L 25/78 704/232 |
| 2010/0217657 | A1* | 8/2010 | Gazdzinski | G06Q 30/0251 705/14.5 |
| 2011/0238407 | A1* | 9/2011 | Kent | G06F 17/289 704/3 |
| 2012/0010887 | A1* | 1/2012 | Boregowda | G10L 15/063 704/250 |
| 2012/0116772 | A1* | 5/2012 | Jones | G06F 19/3418 704/270 |
| 2013/0080165 | A1* | 3/2013 | Wang | G10L 15/14 704/236 |
| 2013/0166279 | A1* | 6/2013 | Dines | G10L 15/02 704/8 |
| 2013/0238337 | A1* | 9/2013 | Kamai | G10L 25/15 704/258 |
| 2014/0114655 | A1* | 4/2014 | Kalinli-Akbacak | G10L 25/63 704/231 |
| 2014/0195232 | A1* | 7/2014 | Kurniawati | G10L 17/04 704/245 |
| 2014/0257803 | A1* | 9/2014 | Yu | G06N 3/0481 704/232 |
| 2014/0282956 | A1* | 9/2014 | Kennedy | H04L 63/08 726/7 |
| 2015/0149174 | A1* | 5/2015 | Gollan | G10L 15/285 704/246 |

OTHER PUBLICATIONS

M.J.F. Gales, Maximum Likelihood Linear Transformations for HMM-Based Speech Recognition, CUES/F-INFENG/TR 291, May 1997.

* cited by examiner

ONLINE INCREMENTAL ADAPTATION OF DEEP NEURAL NETWORKS USING AUXILIARY GAUSSIAN MIXTURE MODELS IN SPEECH RECOGNITION

BACKGROUND

Automatic speech recognition (ASR) technology can be used to map audio utterances to textual representations of those utterances. Some ASR systems use "training" where an individual speaker reads sections of text into the speech recognition system. These systems analyze a specific voice of a person and use the voice to fine tune recognition of that speech for that person resulting in more accurate transcription. Systems that do not use training may be referred to as "Speaker Independent" systems. Systems that use training may be referred to as "Speaker Dependent" systems.

BRIEF SUMMARY

Within examples, a framework for facilitating real-time speech recognition performance using neural networks (NNs) is provided. An online incremental feature-space adaptation may be performed for audio signals having speech content using an acoustic model. Speaker-adapted features can be used to improve the speech recognition performance of the NNs models.

In one aspect, a method is provided that includes receiving, by a computing device, an audio signal at a first time and a subsequent audio signal at a second time different from the first time, where the audio signal and the subsequent audio signal include speech content. The method further includes applying a speaker-specific feature transform to the audio signal to obtain a transformed audio signal. The speaker-specific feature transform may be determined based on one or more speaker-specific speech characteristics of a speaker-profile relating to the speech content. The method also includes processing, by the computing device, the transformed audio signal using a neural network trained to estimate a given speech content of the audio signal. The method further includes modifying the speaker-specific feature transform based on an output of the neural network; and applying the modified speaker-specific feature transform to a subsequent audio signal of the audio signals to obtain a respective transformed audio signal to be processed by the neural network to estimate a respective speech content of the subsequent audio signal.

In another example, a computer readable medium having stored thereon instructions that, when executed by a computing device, cause the computing device to perform functions is provided. The functions comprise receiving an audio signal at a first time and a subsequent audio signal at a second time different from the first time, where the audio signal and the subsequent audio signal include speech content. The functions further comprise applying a speaker-specific feature transform to the audio signal to obtain a transformed audio signal. The speaker-specific feature transform may be determined based on one or more speaker-specific speech characteristics of a speaker-profile relating to the speech content. The functions also comprise processing the transformed audio signal using a neural network trained to estimate a given speech content of the audio signal. The functions also comprise modifying the speaker-specific feature transform based on an output of the neural network to obtain a modified speaker-specific feature transform; and applying the modified speaker-specific feature transform to a subsequent audio signal of the audio signals to obtain a respective transformed audio signal to be processed by the neural network to estimate a respective speech content of the subsequent audio signal.

In still another aspect, a system is provided that comprises at least one processor, and data storage comprising instructions executable by the at least one processor to cause the system to perform functions. The functions comprise receiving an audio signal at a first time and a subsequent audio signal at a second time different from the first time, where the audio signal and the subsequent audio signal include speech content. The functions further comprise applying a speaker-specific feature transform to the audio signal to obtain a transformed audio signal. The speaker-specific feature transform may be determined based on one or more speaker-specific speech characteristics of a speaker-profile relating to the speech content. The functions also comprise processing the transformed audio signal using a neural network trained to estimate a given speech content of the audio signal. The functions also comprise modifying the speaker-specific feature transform based on an output of the neural network to obtain a modified speaker-specific feature transform; and applying the modified speaker-specific feature transform to a subsequent audio signal to obtain a respective transformed audio signal to be processed by the neural network to estimate a respective speech content of the subsequent audio signal.

In still another example, a system is provided that comprises a means for receiving an audio signal at a first time and a subsequent audio signal at a second time different from the first time, where the audio signal and the subsequent audio signal include speech content. The system also includes a means for applying a speaker-specific feature transform to the audio signal to obtain a transformed audio signal. The speaker-specific feature transform may be determined based on one or more speaker-specific speech characteristics of a speaker-profile relating to the speech content. The system further includes a means for processing the transformed audio signal using a neural network trained to estimate a given speech content of the audio signal. The system also includes a means for modifying the speaker-specific feature transform based on an output of the neural network to obtain a modified speaker-specific feature transform; and a means for applying the modified speaker-specific feature transform to a subsequent audio signal to obtain a respective transformed audio signal to be processed by the neural network to estimate a respective speech content of the subsequent audio signal.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
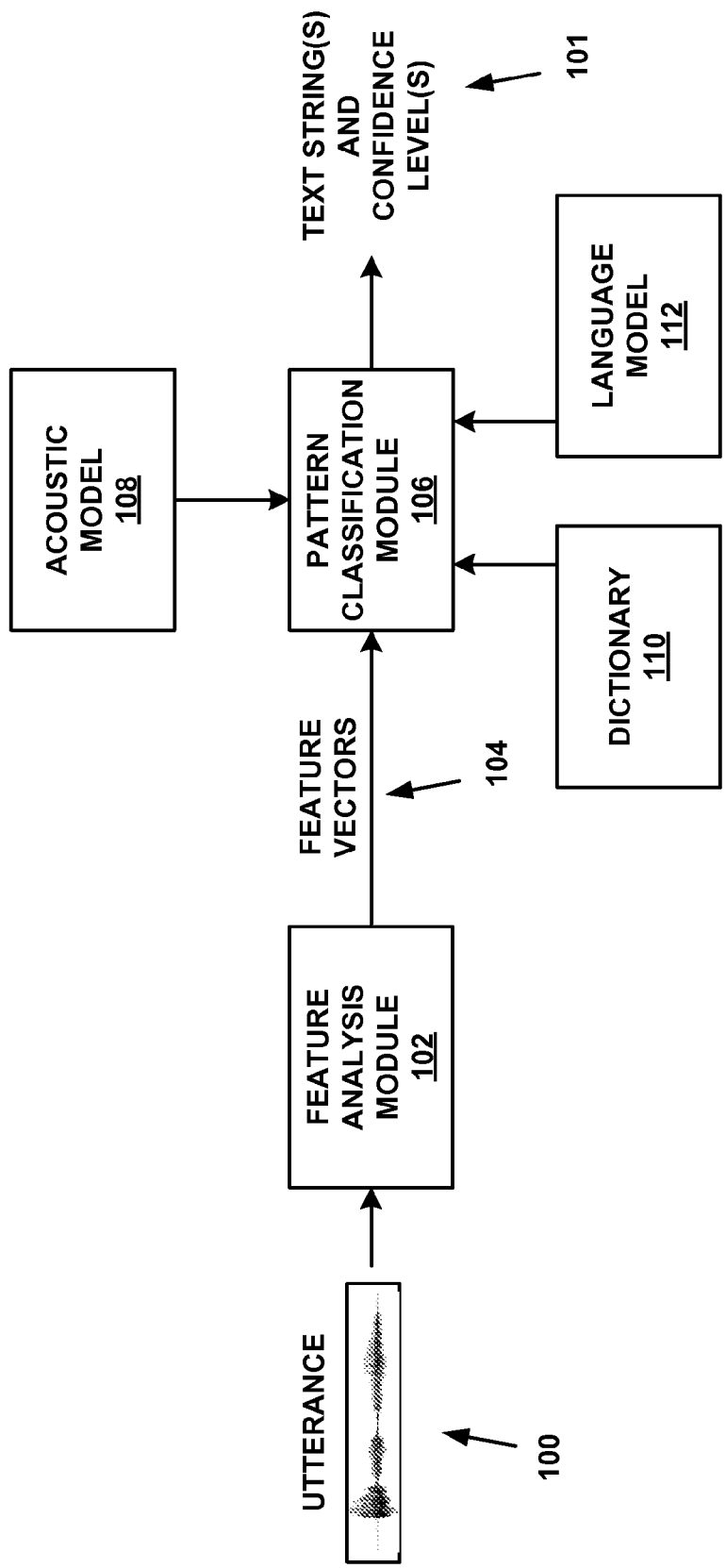
FIG. 1 illustrates an example Automatic Speech Recognition (ASR) system, in accordance with an example embodiment

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

I. Example Automatic Speech Recognition System Overview

As computing power continues to increase, automatic speech recognition (ASR) systems and devices may be deployed in various environments to provide speech-based user interfaces. In an example, ASR can be used to convert a voice search query into a text string that can be sent to a search engine to obtain search results. The potential uses for voice control are many and these examples should not be viewed as limiting.

In an example, ASR can be performed at the device that receives utterances from a speaker. For this device-based ASR, each user device may be configured with an ASR module. In another example, speech recognition can be performed at a remote network server (e.g., a server or cluster of servers on the Internet). While, in this example, speech recognition may not incorporate ASR into user devices, the user devices may still be configured to have a communication path with the remote ASR system (e.g., through Internet access).

In still another example, speech recognition can be performed by use of a local ASR system that offloads performance of at least some aspects of ASR to remote devices. The local ASR system may be a dedicated device or devices performing ASR, or software configured to operate, for instance, on a general purpose computing platform. This local ASR system may be physically located in a residence, business, vehicle, etc., and may operate even if the user devices do not have Internet access.

In some examples, a user device may receive an utterance from a speaker, and transmit a representation of the utterance to the local ASR system. The local ASR system may transcribe the representation of the utterance into a textual representation of the utterance, and transmit this textual representation to the user device. Alternatively, the local ASR system may instead transmit a command based on a transcription of the utterance to the user device. This command may be based on a transcribed textual representation of the utterance, or may be derived more directly from the representation of the utterance. The command may also be of a command set or command language supported by the user device. In one example, the utterance may represent a voice search query, and the local ASR system may be configured to transmit the transcription of the voice search query to a search engine to obtain respective search results that can be communicated to the user device.

FIG. 1 illustrates an example ASR system, in accordance with an embodiment. At run-time, input to the ASR system may include an utterance 100, and the output may include one or more text strings and possibly associated confidence levels 101. The ASR system may include a feature analysis module 102 that may be configured to produce feature vectors 104, a pattern classification module 106, an acoustic model 108, a dictionary 110, and a language model 112. The pattern classification module 106 may incorporate various aspects of the acoustic model 108, the dictionary 110, and the language model 112.

The feature analysis module 102 may be configured to receive the utterance 100. The utterance 100 may include an analog or digital representation of human speech, and may possibly contain background noise as well. The feature analysis module 102 may be configured to convert the utterance 100 to a sequence of one or more feature vectors 104. Each feature vector of the feature vectors 104 may include temporal and/or spectral representations of acoustic features of at least a portion of the utterance 100. For instance, a feature vector may include Mel Filter Cepstral coefficients, Perceptual Linear Predictive coefficients, Relative Spectral coefficients, or Filterbank log-energy coefficients of such a portion.

The mel-frequency cepstrum coefficients may represent the short-term power spectrum of a portion of the utterance 100. They may be based on, for example, a linear cosine transform of a log power spectrum on a nonlinear mel scale of frequency. (A mel scale may be a scale of pitches subjectively perceived by listeners to be about equally distant from one another, even though the actual frequencies of these pitches are not equally distant from one another).

To derive these coefficients, the feature analysis module 102 may be configured to sample and quantize the utterance 100, divide the utterance 100 into overlapping or non-overlapping frames of 15 milliseconds, and perform spectral analysis on the frames to derive the spectral components of each frame. The feature analysis module 102 may further be configured to perform noise removal, convert the standard spectral coefficients to mel-frequency cepstrum coefficients, and calculate first-order and second-order cepstral derivatives of the mel-frequency cepstrum coefficients.

The first-order cepstral coefficient derivatives may be calculated based on the slopes of linear regressions performed over windows of two or more consecutive frames. The second-order cepstral coefficient derivatives may be calculated based on the slopes of linear regressions performed over windows of two or more consecutive sets of first-order cepstral coefficient derivatives. However, there may be other ways of calculating the first-order and second-order cepstral coefficient derivatives.

In some examples, one or more frames of the utterance 100 may be represented by a feature vector of mel-frequency cepstrum coefficients, first-order cepstral coefficient derivatives, and second-order cepstral coefficient derivatives. For example, the feature vector may contain 13 coefficients, 13 first-order derivatives, and 13 second-order derivatives, therefore having a length of 39. However, feature vectors may use different combinations of features in other possible examples.

The pattern classification module 106 may be configured to receive a sequence of the feature vectors 104 from the feature analysis module 102 and produce, as output, one or more text string transcriptions 101 of the utterance 100. Each transcription 101 may be accompanied by a respective confidence level indicating an estimated likelihood that the transcription is correct (e.g., 80% confidence, 90% confidence, etc.).

To produce the text string transcriptions 101, the pattern classification module 106 may be configured to include, or incorporate aspects of the acoustic model 108, the dictionary 110, and/or the language model 112. In some examples, the pattern classification module 106 may also be configured to use a search graph that represents sequences of word or sub-word acoustic features that appear in spoken utterances.

The acoustic model 108 may be configured to determine probabilities that the feature vectors 104 may have been derived from a particular sequence of spoken words and/or sub-word sounds. This may involve mapping sequences of the feature vectors 104 to one or more phonemes, and then mapping sequences of phonemes to one or more words.

A phoneme may be considered to be the smallest segment of an utterance that encompasses a meaningful contrast with other segments of utterances. Thus, a word typically includes one or more phonemes. For example, phonemes may be thought of as utterances of letters; however, some phonemes may present multiple letters. An example phonemic spelling for the American English pronunciation of the word "cat" may be /k/ /ae/ /t/, including the phonemes /k/, /ae/, and/t/. Another example phonemic spelling for the word "dog" may be /d/ /aw/ /g/, including the phonemes /d/, /aw/, and/g/.

Different phonemic alphabets exist, and these alphabets may have different textual representations for the various phonemes therein. For example, the letter "a" may be represented by the phoneme /ae/ for the sound in "cat," by the phoneme /ey/ for the sound in "ate," and by the phoneme /ah/ for the sound in "beta." Other phonemic representations are possible.

Common phonemic alphabets for American English contain about 40 distinct phonemes. Each of these phonemes may be associated with a different distribution of feature vector values. The acoustic model 108 may be configured to estimate the phoneme(s) in a feature vector by comparing the feature vector to the distributions for each of the 40 phonemes, and finding one or more phonemes that are most likely represented by the feature vector.

In one example, the acoustic model 108 may include a hidden Markov model (HMM). An HMM may model a system as a Markov process with unobserved (i.e., hidden) states. Each HMM state may be represented as a multivariate Gaussian distribution that characterizes the statistical behavior of the state. Additionally, each state may also be associated with one or more state transitions that specify a probability of making a transition from a current state to another state.

When applied to an ASR system, the combination of the multivariate Gaussian distribution and the state transitions for each state may define a time sequence of feature vectors over the duration of one or more phonemes. Alternatively or additionally, the HMM may model the sequences of phonemes that define words. Thus, some HMM-based acoustic models may also take into account phoneme context when mapping a sequence of feature vectors to one or more words.

Figure 2:
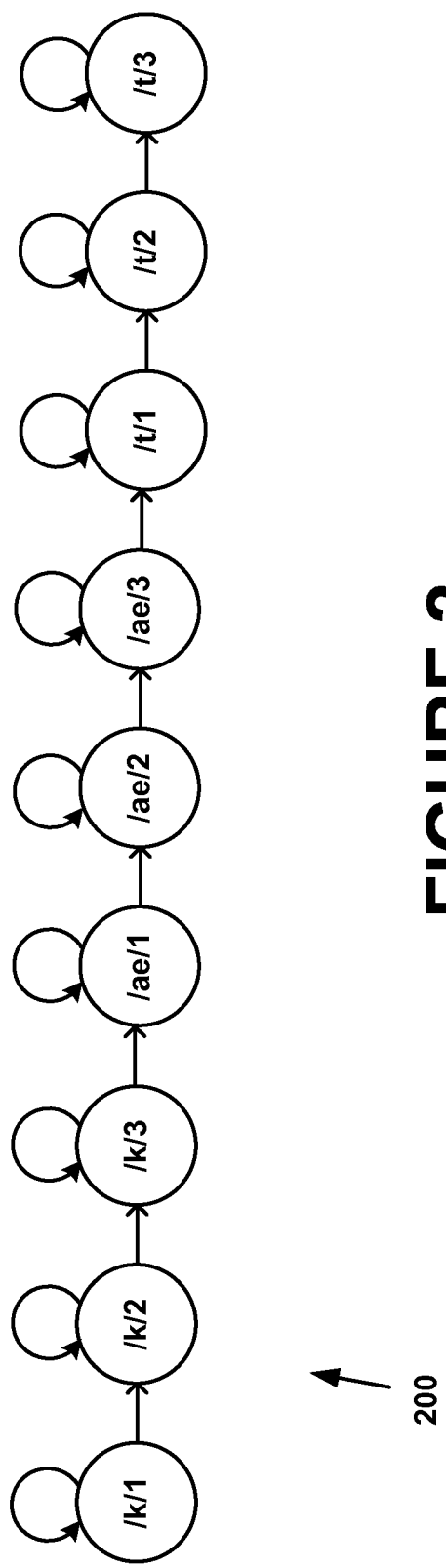
FIG. 2 illustrates aspects of an example acoustic model, in accordance with an embodiment.

FIG. 2 illustrates aspects of an example acoustic model 200, in accordance with an embodiment. The acoustic model 200 defines a sequence of phonemes that make up the word "cat." Each phoneme is represented by a 3-state HMM with an initial state, a middle state, and an end state representing the statistical characteristics at the beginning of phoneme, the middle of the phoneme, and the end of the phoneme, respectively. Each state (e.g., state /k/1, state /k/2, etc.) may represent a phoneme and may include one or more transitions.

The acoustic model 200 may represent a word by concatenating the respective 3-state HMMs for each phoneme in the word together, with appropriate transitions. These concatenations may be performed based on information in the dictionary 110. In some implementations, more or fewer states per phoneme may be used in the acoustic model 200.

The acoustic model 200 may be trained using recordings of each phoneme in numerous contexts (e.g., various words and sentences) so that a representation for each of the phoneme's states can be obtained. These representations may encompass the multivariate Gaussian distributions discussed above.

To train the acoustic model 200, a possibly large number of utterances containing spoken phonemes may each be associated with transcriptions. These utterances may be words, sentences, and so on, and may be obtained from recordings of everyday speech or some other source. The transcriptions may be automatic or manual (human-made) text strings of the utterances.

The utterances may be segmented according to their respective transcriptions. For instance, training of the acoustic model 200 may involve segmenting spoken strings into units (e.g., using either a Baum-Welch and/or Viterbi alignment method), and then using the segmented utterances to build statistical distributions for each phoneme state.

Consequently, as more data (utterances and their associated transcriptions) are used for training, a more accurate acoustic model can be produced. However, even a well-trained acoustic model may have limited accuracy when used for ASR in a domain for which it was not trained. For instance, if a given acoustic model is trained by utterances from a number of speakers of American English, this acoustic model may perform well when used for ASR of American English, but may be less accurate when used for ASR of, e.g., British English.

Also, if the acoustic model 200 is trained using utterances from a number of speakers, it will likely end up representing each phoneme as a statistical average of the pronunciation of this phoneme across all of the speakers. Thus, the acoustic model 200 when trained in this fashion may represent the pronunciation and usage of a hypothetical average speaker, rather than any particular speaker.

Referring back to FIG. 1, the dictionary 110 may define a pre-established mapping between phonemes and words.

This mapping may include a list of tens or hundreds of thousands of phoneme-pattern-to-word mappings, for example. Thus, in some examples, the dictionary 110 may include a lookup table, such as Table 1 shown below. Table 1 illustrates how the dictionary 110 may list phonemic sequences that the pattern classification module 106 may be configured to identify for corresponding words that the ASR system is attempting to recognize. Therefore, the dictionary 110 may be used when developing phonemic state representations of words that are illustrated by the acoustic model 200.

TABLE 1

| Word | Phonemic Interpretation |
|---|---|
| cat | /k/ /ae/ /t/ |
| and | /ay/ /n/ /d/ |
| dog | /d/ /aw/ /g/ |

The language model 112 may be configured to assign probabilities to sequences of phonemes or words, based on a likelihood of that sequence of phonemes or words occurring in an input utterance to the ASR system. Thus, for example, the language model 112 may define a conditional probability of $w_n$ (for $n^{th}$ word in a phrase transcribed from an utterance), given values of a pattern of n−1 previous words in the phrase. An example conditional probability may be expressed as:

$$P(w_n|w_1,w_2,\ldots,w_{n-1})$$

In general, a language model may operate on n-grams, which, for example, may be sequences of n phonemes or words that are represented in the pattern classification module 106. Language models with values of n greater than 5 can require a large memory or storage space; therefore, smaller n-grams (e.g., 3-grams, which are also referred to as tri-grams) may be used to yield acceptable results efficiently. Tri-grams are used herein for purposes of illustration. Nonetheless, any value of n may be may be used with the examples herein.

Language models may be trained through analysis of a corpus of text strings or sequences of words. This corpus may contain a large number of words, e.g., hundreds, thousands, millions or more. These words may be derived from utterances spoken by users of an ASR system and/or from written documents. For instance, the language model 112 can be determined or developed based on word patterns occurring in human speech, written text (e.g., emails, web pages, reports, academic papers, word processing documents, etc.), search queries, and so on.

From such a corpus, tri-gram probabilities can be estimated based on their respective number of appearances in the corpus. In other words, if $C(w_1, w_2, w_3)$ is the number of occurrences of a sequence of words $w_1, w_2, w_3$ in the corpus, then a probability of occurrence for the sequence of words can be expressed as:

$$P(w_3|w_1,w_2) \approx \frac{C(w_1, w_2, w_3)}{C(w_1, w_2)}$$

Thus, the language model 112 may be represented as a table of conditional probabilities. Table 2 illustrates an example of such a table that could form the basis of the language model 112. Particularly, Table 2 contains tri-gram conditional probabilities.

TABLE 2

Tri-gram Conditional Probabilities

P(dog|cat,and) = 0.50
P(mouse|cat,and) = 0.35
P(bird|cat,and) = 0.14
P(fiddle|cat,and) = 0.01

For the 2-gram prefix "cat and," Table 2 indicates that, based on observed occurrences in the corpus, 50% of the time the next 1-gram is "dog." Likewise, 35% of the time, the next 1-gram is "mouse," 14% of the time the next 1-gram is "bird," and 1% of the time the next 1-gram is "fiddle." In a fully-trained ASR system, the language model 112 would contain many more entries, and these entries may include more than just one 2-gram prefix.

Once the acoustic model 108 and the language model 112 are appropriately trained, the feature analysis model 102 and the pattern classification module 106 may be configured to perform ASR. Provided with the input utterance 100, the ASR system can search the space of valid word sequences from the language model 112 to find the word sequence with the maximum likelihood of having been spoken in the utterance 100. However, size of search space can be quite large, and methods to reduce the search space may cause such search to be more computationally efficient. As an example, heuristic techniques that can be used to reduce the complexity of the search, potentially by orders of magnitude. Other methods of limiting the search space are possible. For example, the search space can be constrained to popular phrases in a given period of time.

A finite state transducer (FST) can be used to compactly represent multiple phoneme patterns that map to a single word. Some words, such as "data," "either," "tomato," and "potato," have multiple pronunciations. The phoneme sequences for these pronunciations can be represented in a single FST per word.

This process of creating efficient phoneme-level FSTs can be carried out for each word in the dictionary 110, and the resulting word FSTs can be combined into sentence FSTs using the language model 112. Ultimately, a network of states for phonemes, words, and sequences of words can be developed and represented in a compact search graph.

A. Example HMM Implementation with NN-Based Emission Probabilities

In some examples, the acoustic model 108 may include a neural network (NN) and one or more hidden Markov models (HMMs). Such an implementation is referred to herein as a "hybrid neural network/hidden Markov model," and is abbreviated as "HNN/HMM" (or "HNN/HMMs" in reference to a plurality of HMMs). In a HNN/HMM implementation, one or more HMMs are used to model the fundamental speech units (e.g., phonemes, triphones, etc.), while the neural network is used to determine emission probabilities to apply to the models, based on the observed data (e.g., sequence of feature vectors 104 in the example ASR system in FIG. 1). For purposes of the discussion herein, the fundamental speech units of HMMs will be taken to be triphones, because this is the case for certain ASR systems. However, the principles discussed are not limited to triphones, and that other fundamental speech units can be used (e.g. phonemes, quinphones, clusters of similar and/or related speech units, etc.).

As a spoken sound, a triphone may be modeled as temporally evolving according to a sequence of temporal phases. In examples, triphones may be manifested in speech across three acoustic phases: a start, a middle, and an end. The HMM for a given triphone therefore can be constructed having three states, one corresponding to each acoustic phase. Transitions between states are governed by transition probabilities of the model, and one or more states could include self-transitions that "loop" back to themselves. In addition, each state has an associated emission probability for emitting an output corresponding to the acoustic phase of the triphone. Thus, the HMM for a given triphone is characterized by probabilities of transitioning from a current state to a next state, and upon transitioning, a respective probability of producing (emitting) the acoustic phase associated with the next state. As described below, the emission probabilities may be determined by the neural network, based on the observed utterance as represented in feature vectors derived from a given utterance.

As an example, for the word "dad," the triphone sequence could be modeled with three HMM states each. For example, the triphone "#[d]ae" could be modeled according to states corresponding to "#[d]ae.1," "#[d]ae.2," and "#[d] ae.3,"where the"0.1," "0.2,"and"0.3" signify a temporal order of the states in the HMM for the triphone "#[d]ae." Similarly, the triphone "d[ae]d" could be modeled with a HMM having states corresponding to "d[ae]d.1," "d[ae] d.2," and "d[ae]d.3," and the triphone "ae[d]#" could be modeled with a HMM having states corresponding to "ae [d]#1," "ae[d]#2," "ae[d]#3." This description could be generalized to different number of acoustic phases of triphones (as well as to other phoneme sequences).

The sequential feature vectors 104 derived from the utterance 100 represent a stream of observed acoustic data, while sequential states of one or more concatenated HMMs represent sequences of acoustic phases of triphones in the corpus that probabilistically correspond to the observed acoustic data. While the possible states and their associated transition and emission probabilities of the HMMs may be known, the specific state sequences associated with any given observed sequence of feature vectors is not a priori known (hence the term "hidden"). Recognition of speech in the input utterance 100 therefore involves determining the most probable sequence (or sequences) of states of one or more concatenated HMMs that would produce the observed feature vectors 104. The most probable sequence of states then corresponds to the most probable sequence of triphones (including acoustic phases), from which the output 101 can be determined.

In a HNN/HMM implementation, the determination of the most probable sequences of HMMs and states is carried out one step at a time, where each step corresponds to a feature vector in the sequence of feature vectors 104, and by extension to a frame of sampled audio data. The process can be guided at each new step by the results of the previous step, because the most probable state determined for the previous step may constrain the possible (allowed) states that can be transitioned to on the next step. Thus, for each particular feature vector and each allowed next state, the NN determines a conditional probability that the particular feature vector would be emitted given the allowed next state.

In examples, the NN may be trained before run time to recognize feature vectors as input, and to generate associated conditional probabilities as output. Then, at each time step corresponding to a frame at run time, the NN, based on what NN has "learned" during training, generates a posterior conditional probability of being in the particular allowed next state, given the observed run-time feature vector. On the other hand, the emission probability for each particular allowed next state is a prior conditional probability of emitting the observed feature vector, given that the HMM is in the particular allowed next state. The prior conditional probability—i.e., the emission probability—can be related to the posterior conditional probability through Bayes rule, for example.

In specific terms, the NN may be trained to be able to produce, at run time, the posterior conditional probability $p(q_k|x_j)$, corresponding to the a posteriori probability of the HMM state $q_k$ given the acoustic data $x_j$ observed at run time. The index $k=1, \ldots, K$ runs over K allowed next states of a concatenation of HMM states, while the $x_j, j=1, \ldots, S$ may be taken as a feature vector having S acoustic features. As noted, the training of the NN may take place before run time, using training data (e.g., from the corpus). For the HMM states, Bayes rule can be expressed as:

$$\frac{p(x_j|q_k)}{p(x_j)} = \frac{p(q_k|x_j)}{p(q_k)} \qquad [1]$$

where $p(q_k)$ gives the prior probabilities for the $q_k$ states, and $p(x_j)$ gives the probabilities for the acoustic features. Before run time, the ASR system may also be trained to generate expected output (e.g., text strings) from known input speech (e.g., utterances), from which relative frequencies of the $q_k$, $k=1, \ldots, K$ states, and correspondingly the prior probabilities $p(q_k)$ for the $q_k$ states may be determined. In addition, the probabilities $p(x_j)$ are the same for all states at run time, and so may be treated as a scaling constant in the expression for Bayes rule. Therefore, the a priori emission probabilities $p(x_j|q_k)$ for the $q_k$, $k=1, \ldots, K$ states follow from Bayes rule (equation [1] above) applied at run time for the HMM states.

Once the emission probabilities for all the allowed next states of a time step are computed, the most probable next state for that time step can be determined as the one that maximizes the combined likelihood of being transitioned to, and emitting the observed feature vector. In this manner, the most probable sequence of states corresponding to a sequence of feature vectors is determined, and from which follows the most probable sequence of fundamental speech units in the corpus and a reconstruction of the utterance in the audio input signal.

One of the aspects of using a neural network for determining the emission probabilities is that correlations among feature vectors are accounted for naturally in the "learning" process during training. Consequently, categorization of feature vectors corresponding to the speech samples of the corpus can avoid simplifying assumptions often required by other analysis techniques, such as Gaussian mixture models, to deal with statistical complexities. Moreover, the ability of neural networks to naturally account for correlations among feature vectors also enables determination of the probabilities for a given input feature vector to include input from a sub-sequence of feature vectors preceding and/or following the given feature vector. Feature vectors preceding and/or following a given feature vector can provide additional context for the neural network.

Artificial neural networks (ANNs) may be considered as implementations of a variety classes of regression algorithms and function approximators, including but not limited to feed-forward networks, back-propagation neural networks, convolutional networks, time-delay neural networks, and mixture-density networks. In particular, feed-forward networks may take the form of a multiplicity of interconnected "layers," each including a set of "nodes." A typical architecture may include an input layer, and output layer, and one or more intervening layers, commonly referred to as "hidden" layers.

Each node in a given layer may correspond to a mathematical function for computing a scalar output of one or more inputs. For example, the nodes of the input layer may each receive just one input at a given computational step (e.g., time step), the total number of inputs to the neural network being the total number of nodes in the input layer. The computed outputs of each input-layer node may then serve as input to each node of the next (forward) layer. The nodes of the output layer deliver the output of the neural network, the total number of outputs of neural network being the total number of nodes in the output layer.

All of the nodes may be the same scalar function, differing according to possibly different parameter values, for example. By way of example, the mathematical function could take the form of a sigmoid function, in which case each node could compute a sigmoidal nonlinearity of a weighted sum of its inputs. Other functional forms could be used as well. Training a neural network may involve adjusting parameter values to achieve, to a given level of confidence, known results from known input data. A variety of techniques may be used to train a neural network, including stochastic gradient descent, batch gradient descent, second order methods, Hessian-free optimization, and gradient boost, among possibly others.

As described above, application of a neural network to speech recognition involves providing one or more feature vectors as input, and delivering emission probabilities as output. The effectiveness and/or accuracy of a neural network may depend, at least in part, on the number of nodes per layer, and the number of hidden layers between the input and output layers.

Advances in both hardware and machine learning algorithms have helped to increase the size and efficiency of neural networks. In particular, neural networks with multiple hidden layers can handle large numbers of inputs, which may be characteristic of multiple feature vectors. The neural networks can also handle large numbers of outputs, which can help accommodate emission probabilities corresponding to the large number of HMM states associated with accurate speech modeling. A feed-forward neural network that includes multiple hidden layers may be referred to as a "Deep Neural Network" ("DNN").

In accordance with example embodiments, a HNN/HMM speech recognition system may include a DNN for generation of emission probabilities. By incorporating multiple hidden layers, predicted emission probabilities for a given sequence of input feature vectors may be accurately predicted, correspondingly supporting accurate speech recognition. By appropriately adjusting the respective parameter values of the functions of the nodes during a training process using a large corpus of training data, a DNN can learn to accurately predict emission probabilities given run-time feature vectors.

A neural network (e.g., a DNN), including layers, nodes, and connections between nodes may be implemented as executable instructions stored in one or another form of non-transient computer readable media, and executed by one of more processors of speech synthesis system, for example.

Figure 3:
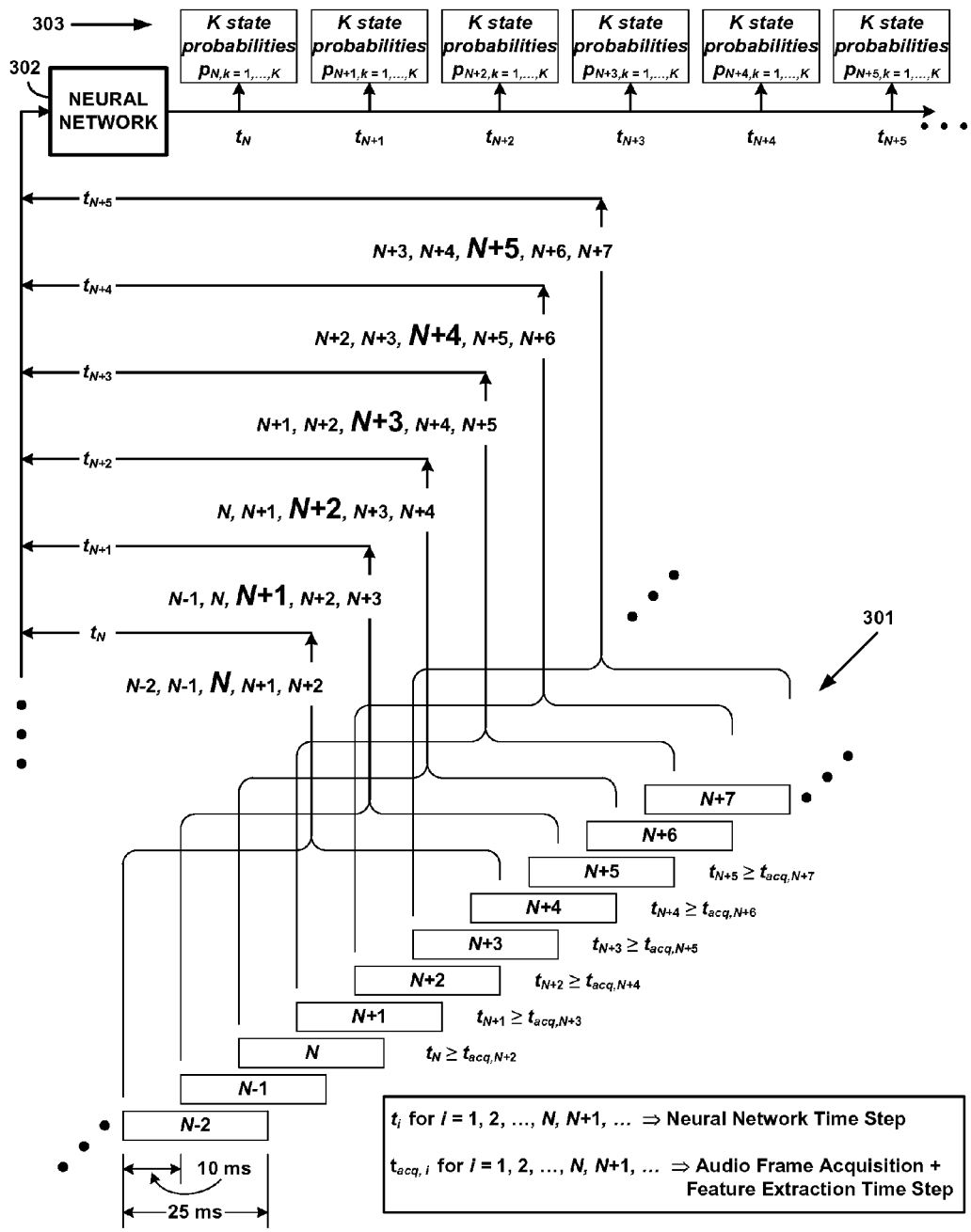
FIG. 3 is a schematic illustration of processing of feature vectors with a neural network (NN) to determine NN-based emission probabilities for hidden Markov models, in accordance with an example embodiment.

FIG. 3 is a schematic illustration of processing of feature vectors with a neural network (e.g., a DNN) to determine emission probabilities for hidden Markov models, in accordance with an example embodiment. In FIG. 3, a time sequence of feature vectors 301 is represented by a "staircase" of overlapping rectangles labeled, by way of example, N−2, N−1, . . . , N, N+1, . . . , N+7, where each label corresponds to a frame time step at which the input audio data was acquired (e.g., digitally sampled). The representation of the feature vectors 301 as overlapping rectangles is meant as an indication that each feature vector corresponds to a frame of sampled audio input (e.g., an utterance), and that each frame may be acquired in a sliding time window. As illustrated by way of example in FIG. 3, each frame (i.e., the time window) is 25 ms in duration, and the time increment between successive windows is 10 ms. With this configuration, each next frame overlaps the previous frame by 15 ms. The time increment between frames (e.g., 10 ms in the present example) can be referred to as the frame period, and the inverse of the frame period can be referred as the frame rate (100 frames per second in the present example).

The feature vectors 301 in FIG. 3 may be the output of sampling and digital processing, such as by the feature analysis module 102 shown in FIG. 1. The frame-like representation of the feature vectors 301 may thus be taken as a visual cue that digital samples of the input utterance 100 may be acquired in time frames using a sliding window, and then subject to feature extraction. In the example illustrated in FIG. 3, each frame of audio data may be acquired (e.g., digitally sampled) at an "acquisition time" $t_{ack,i}$, i=1, 2, . . . , N, N+1, . . . . For purposes of the present discussion, $t_{ack,i}$ may also be considered the time at which feature extraction is performed, although this is not necessarily a restriction of embodiments described herein.

Each feature vector of the sequence 301 may then be presented as input to a neural network 302 for processing at a respective "neural network time step" $t_i$, i=1, 2, . . . , N, N+1, . . . . Note that the $t_i$ may not necessarily be equal to $t_{ack,i}$ for a given value of i=N. The input to the neural network 302 at $t_{i=N}$ may include a feature vector corresponding to a frame acquired at $t_{ack,i=N}$, as well as one or more feature vectors corresponding to frames acquired at times after (and possibly before) $t_{ack,i=N}$. In this case, $t_{i=N} \geq t_{ack,i=N+m}$, where m is the number of additional feature vectors (and frames) following frame N (i.e., right-context frames). For the illustration in FIG. 3, each feature vector input to the neural network 302 includes feature vectors corresponding to two subsequent (and two preceding) frames; hence $t_{i=N} \geq t_{ack,i=N+2}$ for each value of N, as indicated for this example. The legend at lower right of FIG. 3 reiterates the meanings of $t_i$ and $t_{ack,i}$.

By way of example in FIG. 3, feature vectors corresponding to frame times $t_{ack,N}$, $t_{ack,N+1}$, . . . , $t_{ack,N+5}$ (and labeled N, N+1, . . . , N+5) are shown as being input to the neural network at neural network time steps $t_N$, $t_{N+1}$, . . . , $t_{N+5}$. At each neural network time step, each feature vector is shown as being accompanied by two preceding (left-context) and two following (right-context) feature vectors corresponding to preceding and following frame acquisition times.

For example, the input to the neural network 302 at neural network time step $t_N$ includes the feature vector labeled N, together with feature vectors labeled N−2, N−1, N+1, and N+2, corresponding to frame acquisition times $t_{ack,N-2}$, $t_{ack,N-1}$, $t_{ack,N}$, $t_{ack,N+1}$, and $t_{ack,N+2}$. Similarly, the input to the neural network 302 at neural network time step $t_{N+1}$ includes the feature vector labeled N+1, together with feature vectors labeled N−1, N, N+2, and N+3, corresponding to frame acquisition times $t_{ack,N-1}$, $t_{ack,N}$, $t_{ack,N+1}$, $t_{ack,N+2}$, and $t_{ack,N+3}$. This pattern is extended in the figure up to neural network time step $t_{N+5}$ for the feature vector labeled N+5, together with feature vectors labeled N+3, N+4, N+6, and N+7, corresponding to frame acquisition times $t_{ack,N+3}$, $t_{ack,N+4}$, $t_{ack,N+5}$, $t_{ack,N+6}$, and $t_{ackN+7}$. Other arrangements of multiple feature vector input could be used. For instance, each feature vector could be accompanied by four preceding and four following feature vectors. In addition, the number of preceding and following feature vectors need not be equal.

In a HNN/HMM implementation, the neural network 302 may generate at each neural network time step $t_i$, i= 1, 2, . . . , N, N+1, . . . , a set of K emission probabilities $p(x_j|q_k)$ for $q_k$, k=1, . . . , K HMM states according, for example, to equation [1]. As such, the neural network 302 may be considered as operating at the input frame rate. In FIG. 3, for example, a set of K emission probabilities 303 is generated at each of neural network time steps $t_N$, $t_{N+1}$, $t_{N+2}$, $t_{N+3}$, $t_{N+4}$, and $t_{N+5}$. The emission probabilities 303, designated "K state probabilities" in this example, are labeled $p_{N,k=1, \ldots, K}$ at $t_N$; $p_{N+1,k=1, \ldots, K}$ at $t_{N+1}$; $p_{N+2,k=1, \ldots, K}$ at $t_{N+2}$; $p_{N+3,k=1, \ldots, K}$ at $t_{N+3}$; $p_{N+4,k=1, \ldots, K}$ at $t_{N+4}$; and $p_{N+5,k=1, \ldots, K}$ at $t_{N+5}$. Thus, although multiple feature vectors are presented as input to the neural network 302 at each neural network time step, in this example, the output set of emission probabilities may apply to the HMM states at just one frame time, corresponding to just one frame of input audio data.

Figure 4:
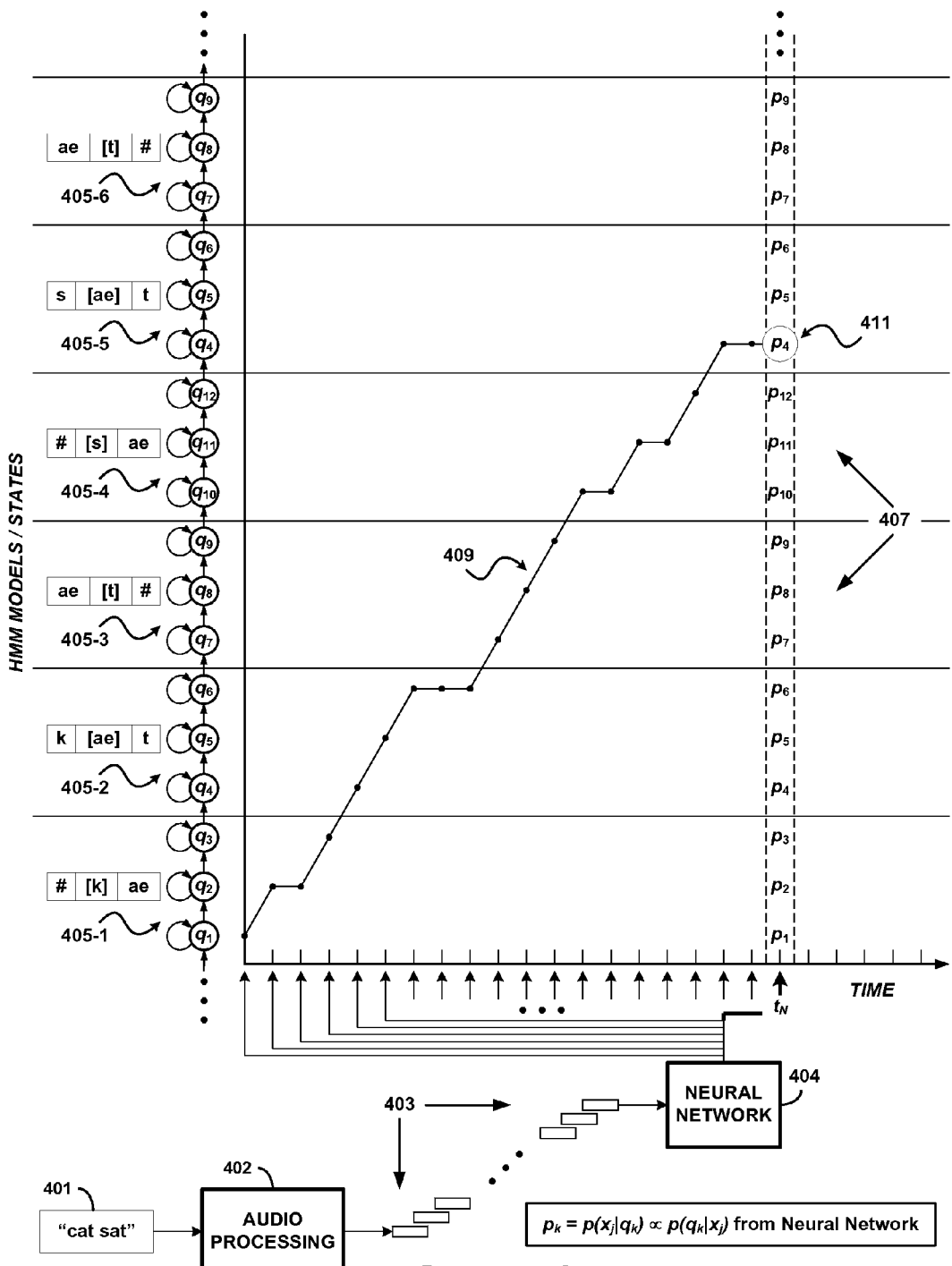
FIG. 4 is a schematic illustration of applying NN-based emission probabilities determined by a neural network to hidden Markov models to determine speech content represented in feature vectors, in accordance with an example embodiment.

FIG. 4 is a schematic illustration of applying NN-based emission probabilities determined by a neural network to hidden Markov models to determine speech content represented in feature vectors, in accordance with an example embodiment. FIG. 4 depicts a graph of observed acoustic data along a time (horizontal) axis versus HMM states along a vertical axis. In the figure, an example utterance 401 of "cat sat" is input to an audio processing module 402, which samples the input in frames and outputs a time sequence of feature vectors 403. The feature vectors 403 are then input to a neural network 404, which outputs respective sets of emission probabilities at each neural network time step. The feature vectors 403 may be considered analogous to the feature vectors 301 shown in FIG. 3, and the neural network 404 may be considered analogous to the neural network 302 also in FIG. 3. Output of the emission probabilities at neural network time steps is represented as a series of short vertical arrows at times marked along the horizontal time axis, and occurs at the frame rate.

A multiplicity of HMMs 405-1, 405-2, 405-3, 405-4, 405-5, and 405-6 is represented as a portion of a concatenation of HMM states pictured along the vertical axis in FIG. 4. Each HMM is used to model a respective triphone, and includes three states corresponding to three acoustic phases of the respective triphone. Each state is represented as a circle enclosing a state label $q_k$, such as $q_1$, $q_2$, $q_3$, etc. An arrow connecting adjacent states signifies a transition between the connected states, while a loop-shaped arrow signifies a "self-transition" that leaves a state unchanged after a given time step.

By way of example, the HMM 405-1 includes states $q_1$, $q_2$, and $q_3$ for modeling the triphone states #[k]ae.1, #[k]ae.2, and #[k]ae.3 of the triphone #[k]ae. Similarly, the HMM 405-2 includes states $q_4$, $q_5$, and $q_6$ for modeling the triphone states k[ae]t.1, k[ae]t.2, and k[ae]t.3 of the triphone k[ae]t. Continuing in this way, the HMM 405-3 includes states $q_7$, $q_8$, and $q_9$ for modeling the triphone states ae[t]#.1, ae[t]#2, and ae[t]#3 of the triphone ae[t]#; the HMM 405-4 includes states $q_{10}$, $q_{11}$, and $q_{12}$ for modeling the triphone states #[s]ae.1, #[s]ae.2, and #[s]ae.3 of the triphone #[s]ae; the HMM 405-5 includes states $q_4$, $q_5$, and $q_6$ for modeling the triphone states s[ae]t.1, s[ae]t.2, and s[ae]t.3 of the triphone s[ae]t; and the HMM 405-6 includes states $q_7$, $q_8$, and $q_9$ for modeling the triphone states ae[t]#.1, ae[t]#2, and ae[t]#3 of the triphone ae[t]#.

Note that, for purposes of illustration, the HMM 405-2 for k[ae]t and the HMM 405-5 for s[ae]t are made up of the same states $q_4$, $q_5$, and $q_6$. This repetition of states is meant to represent how HMM and HMM states may be shared among similar triphones. Similarly, the HMM 405-3 for ae[t]# and the HMM 405-6 also for ae[t]# are made up of the same states $q_7$, $q_8$, and $q_9$. The sharing of states is an example of "clustering" of similar triphones, which may help reduce the number of states that needs to be considered at each time step, as described below.

For a HNN/HMM implementation such as in the present example, the neural network 404 outputs of K emission probabilities for the states of the HMMs at each neural network time step (i.e., at the frame rate). By applying the K emission probabilities to the K HMM states, one of the K states is determined to be most probable at each neural network time step. By repeating this determination at each neural network time step, a path 409 through the graph of observed acoustic data versus HMM states is mapped out by connecting successive points in the graph, also at the frame rate. The path 409 then represents the most likely sequence of HMMs and HMM states, and thereby yields the sequence of triphones in the corpus that most probably corresponds to the input utterance 401, as represented in the feature vectors 403.

By way of example in FIG. 4, a set of emission probabilities 407 is shown as being output from the neural network 404 at a current neural network time step $t_N$. The emission probabilities 407 are labeled as $p_1$, $p_2$, $p_3$, $p_4$, . . . , and may be applied to similarly indexed HMM states. Note that $p_4$, $p_5$, and $p_6$ are repeated for the HMMs 405-2 and 405-5. Similarly, $p_7$, $p_8$, and $p_9$ are repeated for the HMMs 405-3 and 405-6. As indicated by the circle 411 enclosing probability $p_4$, the HMM state $q_4$ of the HMM 405-5 is the most probable next state in this example. The immediately preceding state in this example was also $q_4$ of the HMM 405-5. A legend at the lower right of FIG. 4 reiterates the proportional relation between the a priori emission probabilities and the a posteriori conditional probabilities generated by the neural network.

As indicated by the vertical ellipses extending from HMM 405-6, there may be additional HMMs (and states) available to model the input utterance 401. In particular, considering 40 phonemes (the approximate number for spoken English), there could be approximately 303=64,000 triphones, and thus 3×64,000=192,000 possible HMM triphone states to consider for each feature vector. Clustering of similar triphones and/or triphone acoustic phases, plus constraints that may rule out certain sequences of states, may help reduce this number to approximately 8,000 HMM states. Clustering is represented in FIG. 4 by the repetition of states (e.g., for HMMs 405-2 and 405-5; and for HMMs 405-3 and 405-6), and the repetition of emission probabilities (e.g., $p_4$, $p_5$, and $p_6$; and $p_7$, $p_8$, and $p_9$).

B. Example HMM Implementation with GMM-Based Emission Probabilities

In accordance with example embodiments, the acoustic model 108 may also include an implementation (e.g., one or more coded algorithms) of a Gaussian mixture model (GMM). It should be noted that the singular term GMM applies to a collection or one or more mixtures of Gaussian distributions. As with the HNN/HMM implementation, the same one or more HMMs are used to model the fundamental speech units (e.g., phonemes, triphones, etc.). However, the GMM is used to determine emission probabilities to apply to the models, based on the observed data (i.e., sequence of feature vectors 104 in the example ASR system shown in FIG. 1). For purposes of the discussion herein, the fundamental speech units of HMMs will be taken to be triphones, because this is the case in practice for certain ASR systems. However, the principles discussed herein are not limited to triphones, and that other fundamental speech units can be used (e.g. phonemes, quinphones, clusters of similar and/or related speech units etc.).

In a GMM implementation, the determination of the most probable sequences of HMMs and states is carried out one step at a time, where each step corresponds to a feature vector in the sequence 104, and by extension to a frame of sampled audio data. The particular set of defining features in the feature vectors used in the GMM approach may not necessarily be the same as the set used in NN approach. For purposes of illustration, any such distinction between the defining features in feature vectors used in the GMM and NN approaches may not be apparent in the sequence 104, which can be considered as input to either approach.

As with the HNN/HMM approach, the process of determining the most probable sequence of states corresponding to the input sequence of feature vectors can be guided at each new step by the results of the previous step, since the most probable state determined for the previous step may constrain the possible (allowed) states that can be transitioned to on the next step. Thus, for each particular feature vector and each allowed next state, the GMM determines a conditional probability that the particular feature vector would be emitted given the allowed next state.

In an example, the GMM may be trained before run time to associate feature vectors with conditional probabilities as output. That is, at each time step corresponding to a frame at run time, GMM is used to determine, for each respective HMM state, a conditional probability of observing the feature vector at that time step given the respective HMM state. Thus for each frame, a plurality of GMM-based conditional probabilities is computed, one for each HMM state.

In formal terms, a Gaussian mixture model can be described as a weighted sum of M Gaussian densities, given by the expression:

$$p(x|\lambda) = \Sigma_{i=1}^{M} w_i g(x|\mu_i, \Sigma_i), \quad [2]$$

where x is a D-dimensional continuous-valued vector (i.e., features), $w_i$, i=1, ..., M, are the mixture weights, and $g(x|\mu_i, \Sigma_i)$, i=1, ..., M, are the component Gaussian densities. Each component density is a D-variate Gaussian function of the form:

$$g\left(x \mid \mu_i, \sum_i\right) = \frac{1}{(2\pi)^{D/2}|\Sigma_i|^{1/2}} \exp\left\{-\frac{1}{2}(x-\mu_i)' \sum_i^{-1} (x-\mu_i)\right\}, \quad [3]$$

with mean vector $\mu_i$ and covariance matrix $\Sigma_i$.

During training, the parameters are adjusted for known fundamental speech units to produce mixtures that probabilistically represent the features as observed in the known fundamental speech units. As with the neural network approach, the fundamental speech units could be phonemes, triphones, or clustering of similar triphones and/or triphone acoustic phases.

Once the GMM-based emission probabilities for all the allowed next states of a time step are computed, the most probable next state for that time step can be determined in the same manner as in the HNN/HMM approach. Namely, most probable next state is the one that maximizes the combined likelihood of being transitioned to, and emitting the observed feature vector. As in the HNN/HMM approach, the most probable sequence of states corresponding to a sequence of feature vectors is determined, and from which follows the most probable sequence of fundamental speech units in the corpus and a reconstruction of the utterance in the audio input signal.

While the GMM approach may include simplifying assumptions, such as assuming negligible and/or ignorable correlations of features and/or feature vectors, the implementation costs, both in terms of computational complexity and processing resources, may be significantly smaller than those of the HNN/HMM approach. Moreover, in spite of the simplifying assumptions, the GMM approach may nevertheless yield largely equivalent, or even better, predictive results than the HNN/HMM for a certain subset of fundamental speech units.

Figure 5:
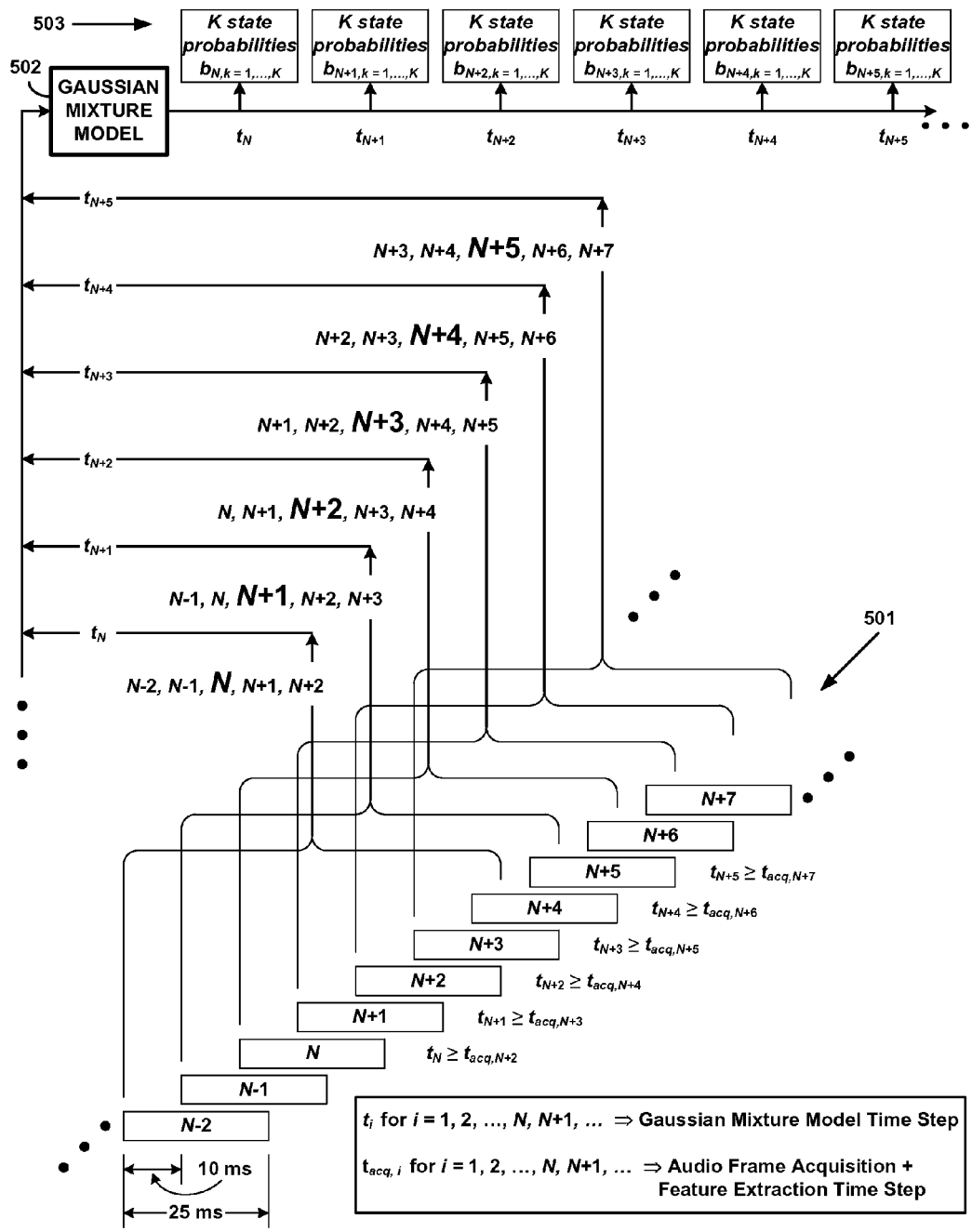
FIG. 5 is a schematic illustration of processing of feature vectors with a Gaussian mixture model (GMM) to determine GMM-based emission probabilities for hidden Markov models, in accordance with an example embodiment.

FIG. 5 is a schematic illustration of processing of feature vectors with a Gaussian mixture model (GMM) to determine GMM-based emission probabilities for hidden Markov models, in accordance with an example embodiment. In FIG. 5, a time sequence of feature vectors 501 is represented again by a "staircase" of overlapping rectangles labeled, by way of example, N−2, N−1, ..., N, N+1, ..., N+7, where each label corresponds to a frame time step at which the input audio data was acquired (e.g., digitally sampled). The representation of the feature vectors 501 is the same as that of feature vectors 301 in FIG. 3, and the previous explanation of feature vectors 301 apply to feature vectors 501 as well. As noted above, however, the specific defining features of the feature vectors 501 may be different than those feature vectors 301.

Each feature vector of the sequence 501 may then be presented as input to a GMM 502 for processing at a respective "GMM time step" $t_i$, i=1, 2, ..., N, N+1, .... As with the sequence 301, $t_i$ may not necessarily be equal to $t_{ack,i}$ for a given value of i=N, and the input to the GMM 502 at $t_{i=N}$ may include a feature vector corresponding to a frame acquired at $t_{ack,i=N}$, as well as one or more feature vectors corresponding to frames acquired at times after (and possibly before) $t_{ack,i=N}$. In this case, $t_{i=N} \geq t_{ack,i=N+m}$, where m is the number of additional feature vectors (and frames) following frame N. For the illustration in FIG. 5, each feature vector input to the GMM 502 again includes feature vectors corresponding to two subsequent (and two preceding) frames; hence $t_{i=N} \geq t_{ack,i=N+2}$ for each value of N, as indicated for this example. The legend at lower right of FIG. 5 reiterates the meanings of $t_i$ and $t_{ack,i}$.

By way of example in FIG. 5, feature vectors corresponding to frame times $t_{ack,N}$, $t_{ack,N+1}$, ..., $t_{ack,N+5}$ (and labeled N, N+1, ..., N+5) are shown at being input to the GMM at neural GMM steps $t_N$, $t_{N+1}$, ..., $t_{N+5}$. At each GMM time step, each feature vector is shown as being "accompanied" by two preceding (left-context) and two following (right-context) feature vectors corresponding to preceding and following frame acquisition times.

Note that the number of left-context and right-context feature vectors need not be the same as in the HNN/HMM approach (e.g. as illustrated in the sequence 301), and that other arrangements of multiple feature vector input could be used. For instance, each feature vector in sequence 501 could be accompanied by four left-context and four right-context feature vectors. In addition, the number of left-context and right-context feature vectors need not be equal even within just sequence 501.

In a GMM implementation, the GMM 502 may generate at each GMM time step $t_i$, i=1, 2, . . . , N, N+1, . . . , a set of K emission probabilities $b(x_j|q_k)$ for $q_k$, k=1, . . . , K HMM states according, for example. As such, the GMM 502 may be considered as operating at the input frame rate. In FIG. 5, for example, a set of K emission probabilities 503 is generated at each of GMM time steps $t_N$, $t_{N+1}$, $t_{N+2}$, $t_{N+3}$, $t_{N+4}$, and $t_{N+5}$. The emission probabilities 503, designated "K state probabilities" in this example, are labeled $b_{N,k=1, \ldots, K}$ at $t_N$; $b_{N+1,k=1, \ldots, K}$ at $t_{N+1}$; $b_{N+2,k=1, \ldots, K}$ at $t_{N+2}$; $b_{N+3,k=1, \ldots, K}$ at $t_{N+3}$; $b_{N+4,k=1, \ldots, K}$ at $t_{N+4}$; and $b_{N+5,k=1, \ldots, K}$ at $t_{N+5}$. Thus, although multiple feature vectors are presented as input to the GMM 502 at each GMM time step, the output set of emission probabilities may apply to the HMM states at just one frame time, corresponding to just one frame of input audio data.

Figure 6:
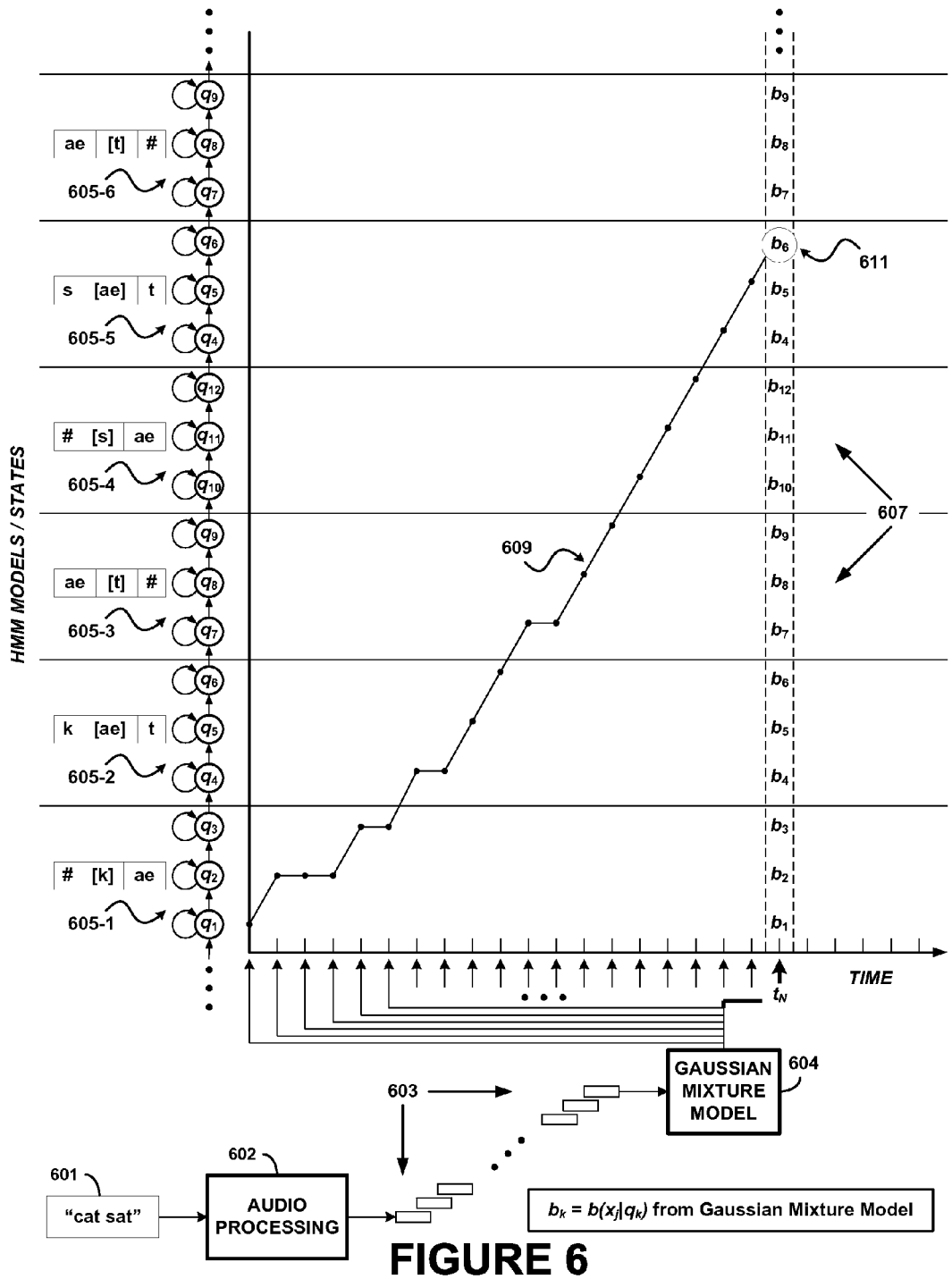
FIG. 6 is a schematic illustration of applying GMM-based emission probabilities determined by a Gaussian mixture model to hidden Markov models to determine speech content represented in feature vectors, in accordance with an example embodiment.

FIG. 6 is a schematic illustration of applying GMM-based emission probabilities determined by a Gaussian mixture model to hidden Markov models to determine speech content represented in feature vectors, in accordance with an example embodiment. FIG. 6 may be considered analogous to FIG. 4. Again, an example utterance 601 of "cat sat" is input to an audio processing module 602, which samples the input in frames and outputs a time sequence of feature vectors 603. The feature vectors 603 are then input to a GMM 604, which outputs respective sets of emission probabilities at each neural network time step. The feature vectors 603 may be considered analogous to the feature vectors 501 shown in FIG. 5, and the GMM 604 may be considered analogous to the GMM 502 also in FIG. 5. Output of the emission probabilities at GMM time steps is again represented as a series of short vertical arrows at times marked along the horizontal time axis, and occurs at the frame rate.

A multiplicity of HMMs 605-1, 605-2, 605-3, 605-4, 605-5, and 605-6 is again represented as a portion of a concatenation of HMM states pictured along the vertical axis in FIG. 6. As in FIG. 4, each HMM is used to model a respective triphone, and includes three states corresponding to three acoustic phases of the respective triphone. The format of the HMMs is the same as in FIG. 4.

For a GMM implementation such as in the present example, the GMM 604 outputs of K emission probabilities for the states of the HMMs at each GMM time step (i.e., at the frame rate). As with the HNN/HMM approach, applying the K emission probabilities to the K HMM states, determines the most probable next state at each GMM time step. By repeating this determination at each GMM time step, a path 609 through the graph of observed acoustic data versus HMM states is mapped out by connecting successive points in the graph, also at the frame rate. The path 609 then represents the most likely sequence of HMMs and HMM states, and yields the sequence of triphones in the corpus that most probably corresponds to the input utterance 601, as represented in the feature vectors 603. For purposes of illustrating possibly different results yield by the GMM and HNN/HMM approaches, the path 609 is depicted as being slightly different than the path 409.

By way of example in FIG. 6, a set of emission probabilities 607 is shown as being output from the GMM 604 at a current neural network time step $t_N$. The emission probabilities 607 are labeled as $b_1$, $b_2$, $b_3$, $b_4$, . . . , and may be applied to similarly indexed HMM states. Note that $b_4$, $b_5$, and $b_6$ are repeated for the HMMs 605-2 and 605-5. Similarly, $b_7$, $b_8$, and $b_9$ are repeated for the HMMs 605-3 and 605-6. As indicated by the circle 611 enclosing probability $b_6$, the HMM state $q_6$ of the HMM 605-5 is the most probable next state in this example. The immediately preceding state in this example was $q_5$ of the HMM 605-5. A legend at the lower right of FIG. 6 defines the conditional probabilities generated by the GMM.

II. Examples of Speaker Adaptation

Figure 7:
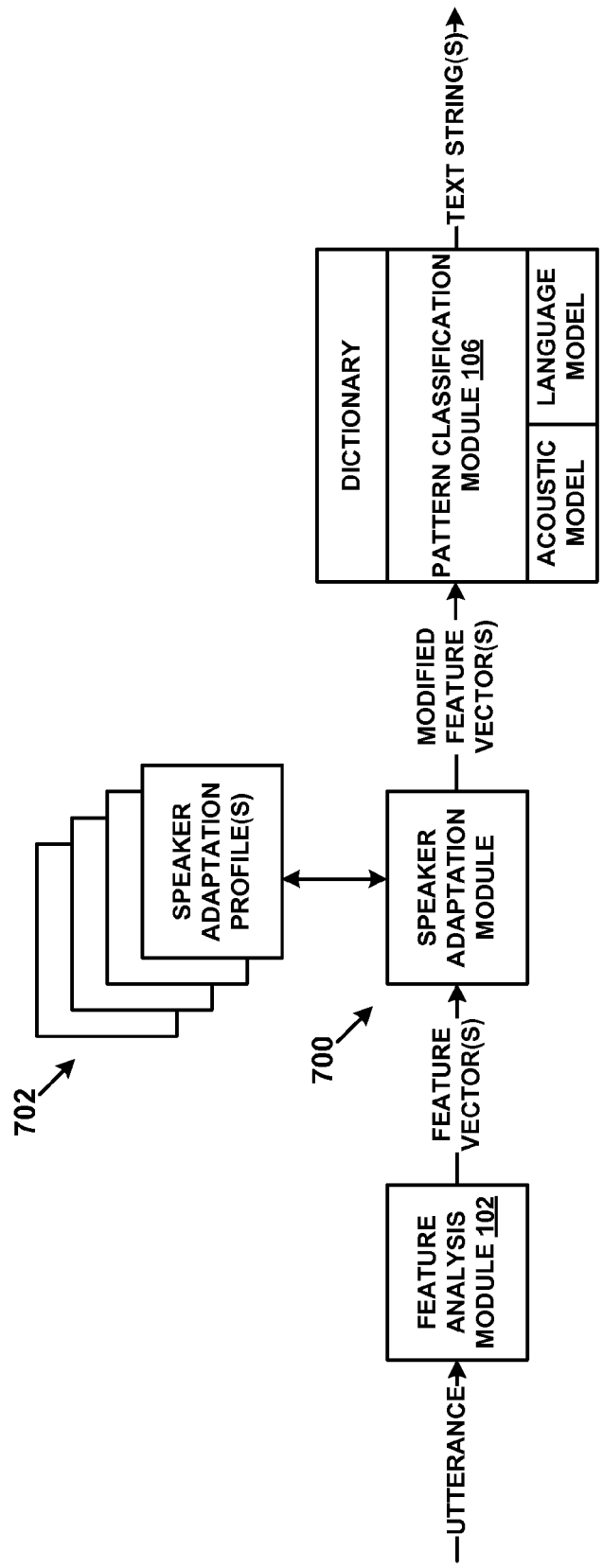
FIG. 7 illustrates an ASR system with speaker adaptation, in accordance with an example embodiment

Acoustic models may be trained with utterances from multiple speakers in multiple environments. As a result, a given acoustic model may represent a hypothetical average speaker, and might not perform well when applied to utterances from a speaker whose vocal characteristics differ from those of the hypothetical average speaker. Therefore, ASR systems may attempt to compensate for these differences through speaker adaptation A. Speaker Adaptation Profiles FIG. 7 depicts an ASR system with speaker adaptation, in accordance with an example embodiment. Particularly, an utterance is provided as input to feature analysis module 102, which produces one or more feature vectors based on the utterance. These feature vectors may be provided to speaker adaptation module 700, which may be configured to modify the feature vectors according to one or more of speaker adaptation profile(s) 702. The modified feature vectors may be provided to the pattern classification module 106, which in turn may produce one or more text string transcriptions of the utterance.

Speaker adaptation profiles 702 may include default, gender-specific, and/or speaker-dependent profiles. A default profile may be a profile that the ASR system uses when no other profile has been selected. For instance, when the ASR system begins speech recognition, the ASR may be configured to apply the default profile to feature vectors. Additionally, the default profile may be applied to utterances received after the ASR system has been idle for some period of time (e.g., 1-10 minutes or more) or after the ASR system detects that the speaker has changed. In some examples, the default profile may not perform any speaker adaptation. Thus, for some default profiles, the modified feature vectors may be the same as the feature vectors.

Speaker-adaptation profiles 702 may also include one or more environment-specific, speaker-dependent profiles. Each of these profiles may be associated with a particular speaker speaking in a particular environment or location. For example, one such profile might be based on the particular speaker speaking in a quiet location, with little background noise. Another such profile might be based on the particular speaker speaking in an environment with a given type of background noise, such as an office or a car. Thus, an environment-specific, speaker-dependent speaker adaptation profile for the speaker may be based on the characteristics of the input utterances, location of the speaker, and/or the user device that receives the utterance.

In examples, each of the feature vectors may be of a particular length (e.g., n entries), and may include representations of the temporal and/or spectral acoustic features of at least a portion of the utterance. In some embodiments, the speaker adaptation parameters may take the form of a matrix, for instance, an n×n matrix. In order to perform speaker adaptation, the speaker adaptation module 700 may be configured to multiply each feature vector received by the matrix, resulting in updated feature vectors. These updated feature vectors may be transmitted to the pattern classification module 106.

The acoustic model used by pattern classification module 106 may be speaker-independent, and the speaker adaptation module 700 may use the matrix to adapt speaker-dependent feature vectors so that they are more likely to be properly recognized by the acoustic model. In some cases, the matrix may be a diagonal matrix (i.e., for each entry (i,j) in the matrix, the entry takes on a non-zero value if i is equal to j, but takes on a value of zero if i is not equal to j). Since at least half of the entries in a 2×2 or greater diagonal matrix contain zeroes, less computation is required to multiply a feature vector by a diagonal matrix than a non-diagonal matrix. (Herein, a non-diagonal matrix refers to a matrix in which at least one entry for which i is not equal to j contains a non-zero value.)

B. Gaussian Mixture Models as Speech Models

From time to time, periodically, and/or on an ongoing basis, the ASR system may compare the characteristics of received utterances to speech models associated with one or more speaker adaptation profiles. Based on the outcome of this comparison, a new speaker adaptation profile may be selected, or the current speaker adaptation profile may continue to be applied.

In some examples, the speech models may be represented as Gaussian mixture models (GMMs). A GMM may probabilistically represent the likelihood that a particular speaker is speaking based on feature vectors derived from an input utterance. Formally, a GMM may be a weighted sum of M Gaussian random variables, each with potentially different mean and covariance parameters. An example GMM is given by:

$$p(x|w_i, \mu_i, \Sigma_i) = \Sigma_{i=1}^{M} w_i g(x|\mu_i, \Sigma_i), i=1 \ldots M \quad [4]$$

where x is an n-dimensional feature vector, $w_i$ are weights such that $\Sigma_{i=1}^{M} w_i = 1$, and $g(x|\mu_i, \Sigma_i)$ is an n-dimensional Gaussian function with a mean of $\mu_i$ and a covariance matrix of $\Sigma_i$. The speech model for a given profile may be represented as $$\lambda = \{w_i, \mu_i, \Sigma_i\}, i=1 \ldots M \quad [5]$$

GMMs can be used to approximate arbitrarily-shaped probability density functions. Thus, GMMs are powerful tools for representing distributions of feature vectors in ASR systems. In some implementations, full covariance matrices are not used, as partial covariance matrices (e.g., diagonal matrices wherein each non-zero entry represents the variance of a particular component Gaussian function) can provide suitable results C. Profile Selection Assume that the ASR system has access to a set of S speaker adaptation profiles represented by speech models $\lambda_1, \lambda_2, \ldots, \lambda_S$, respectively. A goal of speaker adaptation is to select the profile, $\hat{S}$, with a speech model that has the maximum a posteriori probability of being the closest fit for a series of feature vectors. Formally, $$\hat{S} = \text{argmax}_{1 \le k \le S} p(\lambda_k|X) = \text{argmax}_{1 \le k \le S} \Sigma_{t=1}^{T} \log p(x_t, \lambda_k) \quad [6]$$

where X is a series of T feature vectors, $x_t$, $1 \le t \le T$. The final equation can be derived from $\text{argmax}_{1 \le k \le S} p(\lambda_k|X)$ through application of Bayes Rule and some simplifying assumptions. Note that $p(x_t|\lambda_k) = p(x_t|w_k, \mu_k, \Sigma_k)$, and thus the solution to this term is provided by equations [4] and [5].

When selecting a profile, any value of T may be used. For instance, assuming that a feature vector is derived from 10 milliseconds of an input utterance, anywhere from one to several thousand feature vectors may be evaluated according to the equations above, and a profile that fits a majority of the feature vectors may be selected.

D. Speech Model Training

A speech model for a particular speaker adaptation profile (e.g., for speakers of a specific gender, a particular speaker, and/or a particular speaker in a specific environment or location) may be trained based on input utterances. For instance, a female-specific speech model may be trained with utterances from various female speakers in various environments. A speaker-dependent speech model may be trained with utterances from a particular speaker in various environments. An environment-specific, speaker-dependent speech model may be trained with utterances from a particular speaker in a particular environment.

One way of conducting this training is to iteratively calculate a maximum likelihood estimate of a GMM given T observed feature vectors using an expectation-maximization technique. Particularly, this technique provides estimates of the parameters $\lambda = (w_i, \mu_i, \Sigma_i)$. Formally, $$\overline{w}_i = \frac{1}{T} \sum_{t=1}^{T} p(i|x_t, \lambda) \quad [6]$$

$$\overline{\mu}_i = \frac{\sum_{t=1}^{T} p(i|x_t, \lambda) x_t}{\sum_{t=1}^{T} p(i|x_t, \lambda)} \quad [7]$$

$$\overline{\sigma}_i^2 = \frac{\sum_{t=1}^{T} p(i|x_t, \lambda) x_t^2}{\sum_{t=1}^{T} p(i|x_t, \lambda)} - \overline{\mu}_i^2 \quad [8]$$

where, $$p(i|x_t, \lambda) = \frac{w_i g(x_t|\mu_i, \Sigma_i)}{\sum_{k=1}^{M} w_k g(x_t|\mu_k, \Sigma_k)} \quad [9]$$

Note that, for sake of simplicity, these equations calculate the variances, $\sigma_i^2$, rather than the full covariance matrix, $\Sigma_i$. However, as noted above, these variances can be used to form a diagonal covariance matrix that is sufficient for this example embodiment.

III. Example Operations

Although NNs, such as DNNs, may be characterized by superior ability to discriminate HMM states, the GMMs have the advantages of easily parallelizable training, fast and efficient speaker adaptation, and being more computationally efficient than DNNs. Furthermore, GMMs exhibit different error patterns compared to the DNNs. Thus, DNNs and GMMs may be complementary. DNNs and GMMs may be combined to improve speech recognition performance. In addition, because target distributions for DNN training may be obtained from forced alignments generated by a baseline GMM system, the GMMs can be used directly at run-time or in real-time without training computational overhead.

Speaker adaptation may be utilized to reduce mismatch between training and decoding conditions. Various adaptation techniques can be used with GMM-based acoustic models. These techniques can be divided into two categories: model-space adaptation, and feature-space adaptation. Feature-space adaptation may not require modifying the entire acoustic model. Thus, feature-space adaptation may be suited for real-time ASR server systems. Constrained maximum likelihood linear regression (CMLLR), also called feature-space MLLR (fMLLR), is an example of feature-space adaptation that can be used with a GMM-based acoustic model for real-time speech recognition.

Unsupervised online fMLLR may be configured to estimate and update a speaker-specific affine transformation of the feature vectors during decoding. Let $o_t$ be the n-dimensional feature vector at time frame t, the transformed feature $\hat{o}_t$ is, $$\hat{o}_t = A o_t + b \quad [10]$$

Where A is n×n rotation/scaling matrix, b is n×1 bias term. The transform parameters W=[A b] can be estimated by optimizing an auxiliary Q-function and can be solved iteratively, for example.

For GMM systems, fMLLR may improve the recognition accuracy with 5 seconds of speech data, for example. In examples, with sufficient amount of adaptation data, fMLLR may achieve 10% to 20% relative improvement in terms of word error rate (WER), compared to a speaker independent baseline. Because fMLLR may be configured to adapt input feature vectors, fMLLR may be used to transform the feature vector for DNNs, if the DNNs share the same feature space as the underlying GMMs.

Figure 8:
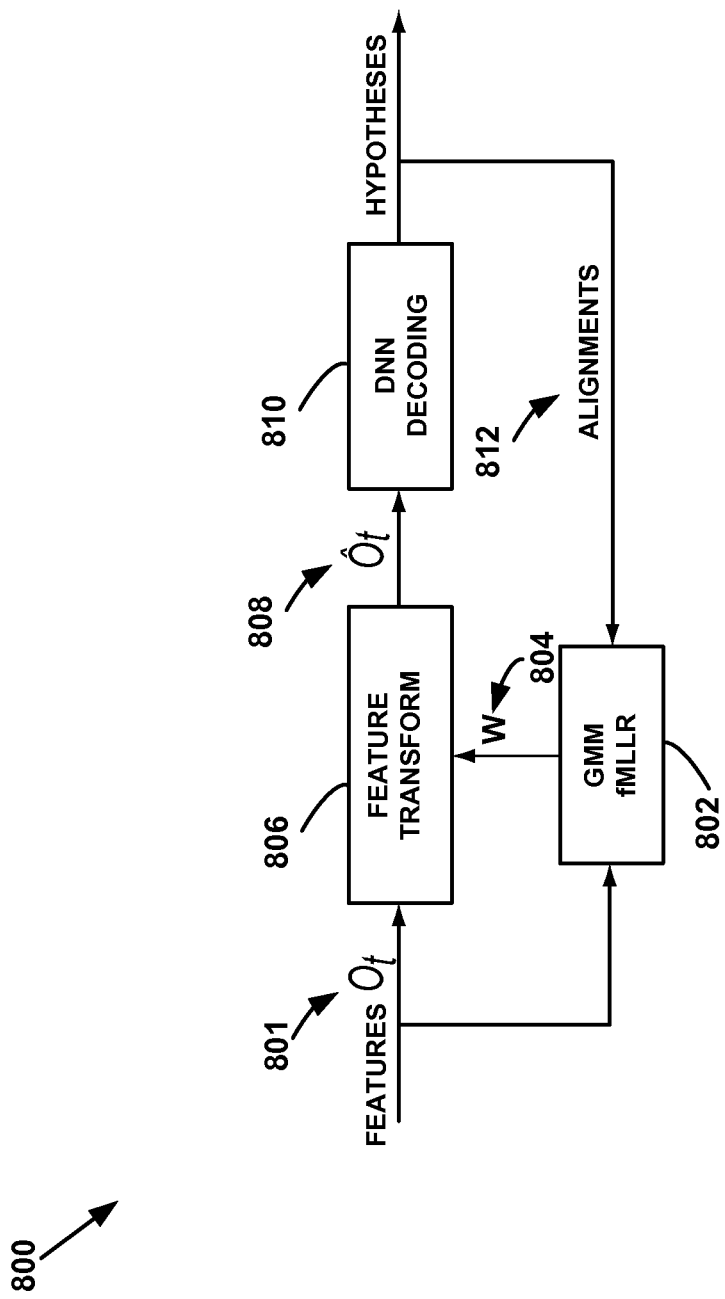
FIG. 8 is a block diagram illustrating a system for online incremental adaptation for a neural network, in accordance with an embodiment.

FIG. 8 is a block diagram illustrating a system 800 for online incremental adaptation for a neural network, in accordance with an embodiment. As shown in FIG. 8, for each utterance, a computing device may be configured to extract feature vectors 801, $o_{1:T}$. The computing device may be configured to implement a GMM fMLLR block 802 to determine a transform 804, such as the transform W=[A b] in equation [10]. The computing device may be configured to apply the transform at block 806 to feature vectors 801 to transform the feature vectors 801 to transformed feature vectors 808, $\hat{o}_{1,T}$, adapted to a specific speaker. The computing device may be configured to process the transformed feature vectors 808 by a DNN decoding block 810 to determine speech content of the input utterances.

Further, in examples, outputs 812 (e.g., alignments) of the DNN decoding block 810, can be fed back to the GMM fMLLR block 802. The GMM fMLLR block 802 may be configured to utilize the outputs 812 to modify the transform 804. The computing device may be configured to apply the modified transform to a consecutive utterance or audio signal. The transform 804 may be initialized to an identify transform (e.g., identity matrix), and may be modified or updated upon processing each utterance or audio signal. Each modified transform is applied to feature vectors of a following or consecutive utterance.

Components of the system 800 may be configured to work in an interconnected fashion with each other and/or with other components coupled to respective systems. One or more of the described functions, components, or blocks of the system 800 may be divided up into additional functional or physical components, or combined into fewer functional or physical components. In some further examples, additional functional and/or physical components may be added to the examples illustrated by FIG. 8. The system 800 may include or be provided in the form of a processor (e.g., a microprocessor, a digital signal processor (DSP), etc.) configured to execute program code including one or more instructions for implementing logical functions described at the GMM fMLLR block 802, the feature transform block 806, and the DNN decoding block 810. The system 800 may further include any type of computer readable medium (non-transitory medium) or memory, for example, such as a storage device including a disk or hard drive, to store the program code. In other examples, the system 800 may be included within other systems.

Figure 9:
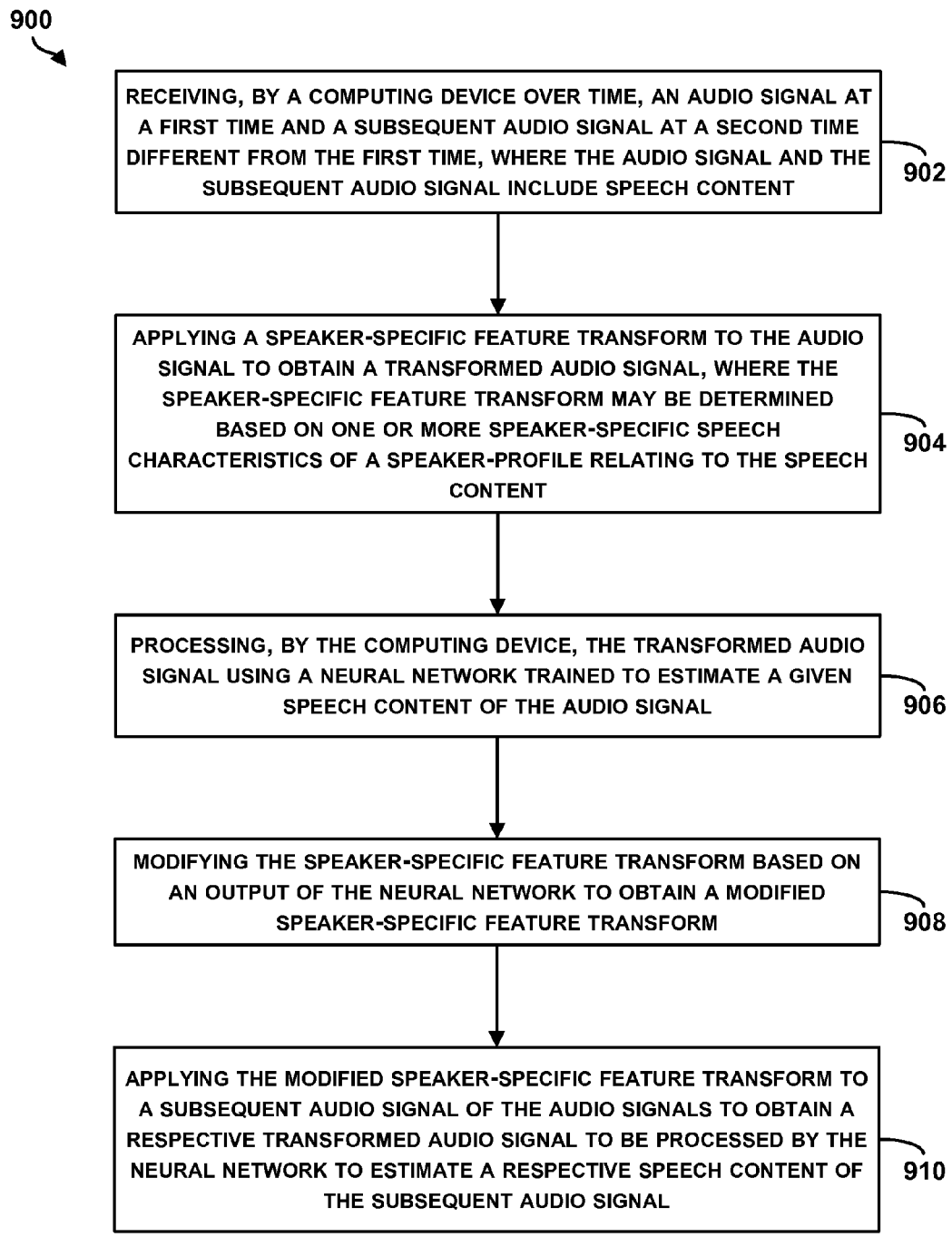
FIG. 9 is a flowchart of an example method for online incremental adaptation of neural networks using auxiliary Gaussian mixture models in speech recognition, in accordance with an embodiment.

FIG. 9 is a flowchart of an example method 900 for online incremental adaptation of neural networks using auxiliary Gaussian mixture models in speech recognition, in accordance with an embodiment. The method 900 shown in FIG. 9 presents an example method that, for example, can be used with the system 800, and may be performed by a device, a server, or a combination of the device and the server.

The method 900 may include one or more operations, functions, or actions as illustrated by one or more of blocks 902-910. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation In addition, for the method 900 and other processes and methods disclosed herein, the flowchart shows functionality and operation of one possible implementation of present examples. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 900 and other processes and methods disclosed herein, each block in FIG. 9 may represent circuitry that is wired to perform the specific logical functions in the process.

At block 902, the method 900 includes receiving, by a computing device, an audio signal at a first time and a subsequent audio signal at a second time different from the first time, wherein the audio signal and the subsequent audio signal include speech content. The computing device can be, for example, a mobile telephone, personal digital assistant (PDA), laptop, notebook, or netbook computer, tablet computing device, a wearable computing device, a server in a cloud-based computing system, etc. The computing device may be configured to receive, over time, input audio signals associated with utterances by a given speaker. As an example, the computing device may be a mobile phone, and the speaker may be a user of the phone. The user may utter, over time, a series of commands to the phone. The computing device may be configured to receive, over time, a series of audio signals corresponding to the series of utterances or commands, for example, and may be configured to recognize respective speech content of each audio signal.

In an example, the computing device may be configured to determine a sequence of feature vectors for each audio signal. Each respective feature vector of the sequence may correspond to a respective temporal frame of a sequence of temporal frames of a respective audio signal. Further, each feature vector may bear quantitative measures of acoustic properties of the corresponding temporal frame. Each temporal frame may contain a portion of the audio signal digitally sampled within a sliding time window, for example. Each feature vector may include quantitative measures of acoustic properties of the digitally sampled signal within the corresponding time frame.

In examples, the feature vectors may include Mel Filter Cepstral (MFC) coefficients. Other possible types of quantitative measures of acoustic properties may include Perceptual Linear Predictive (PLP) coefficients, Relative Spectral (RASTA) coefficients, and Filterbank log-energy coefficients. These types of coefficients are examples for illustration only, and the feature vectors may include other types of quantitative measures, and may also include more than one type.

Figure 10:
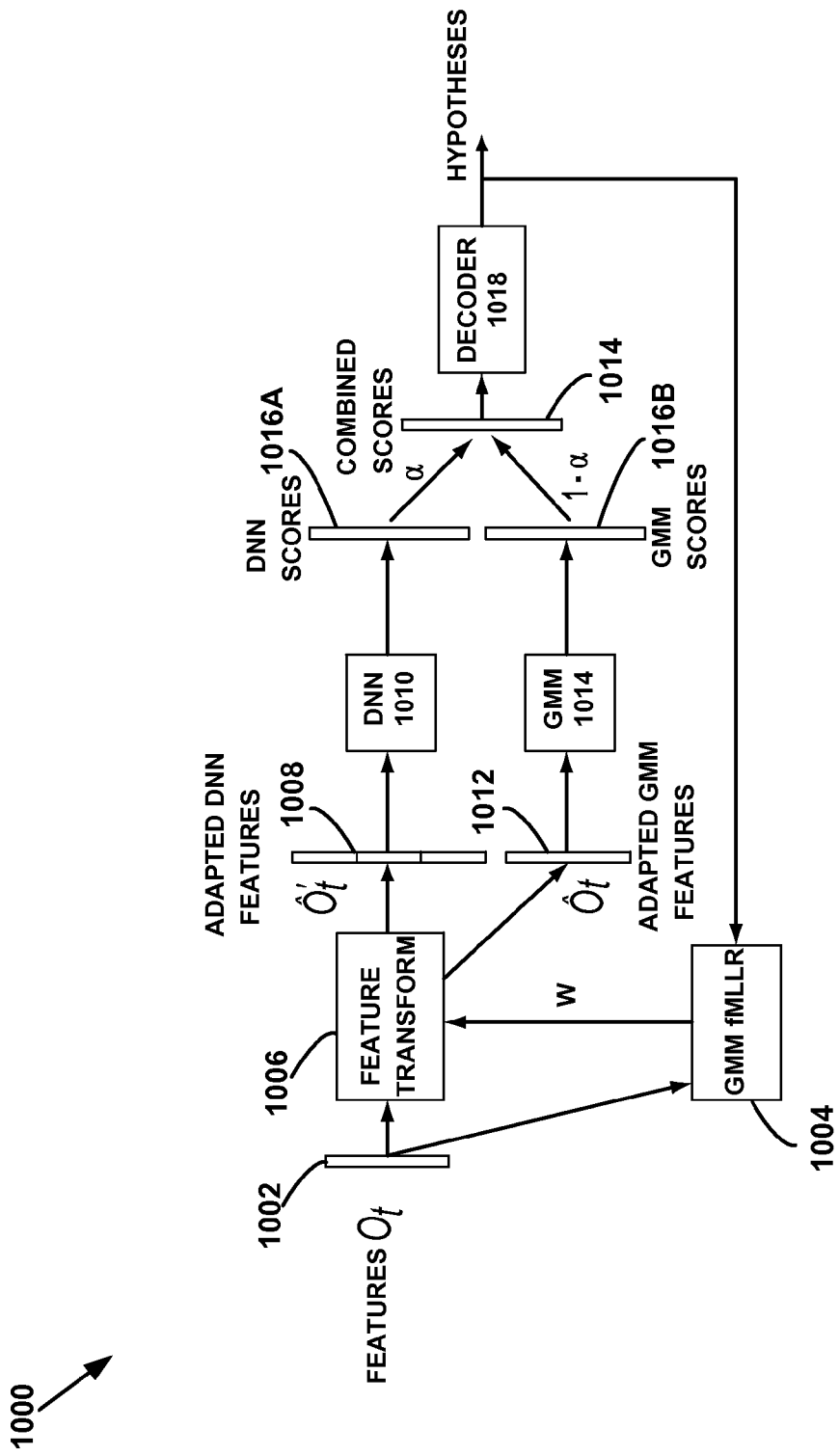
FIG. 10 illustrates speaker-adapted state-level score combination of deep neural network and Gaussian mixture model, in accordance with an embodiment.

FIG. 10 illustrates a system 1000 for speaker-adapted state-level score combination of deep neural network and Gaussian mixture model, in accordance with an embodiment. The system 1000 may for example be configured to implement the method 900, for example. At block 1002, the computing device may be configured to extract the feature vectors $o_t$ corresponding to each audio signal.

At block 904, the method 900 includes applying a speaker-specific feature transform to the audio signal to obtain a transformed audio signal, where the speaker-specific feature transform may be determined based on one or more speaker-specific speech characteristics of a speaker-profile relating to the speech content. In FIG. 10, the computing device, at block 1004, may be configured to use a GMM fMLLR technique and speaker-specific adaptation data (e.g., speaker profile or speech characteristics as described in Section II) to determine a transform W. In examples, the speaker-specific feature transform may be initialized to an identify matrix. As more audio signals are processed (as described with respect to the system 800), the computing device may be configured to modify or update the transform with speaker-specific characteristics as described at block 908 below. At block 1006 in FIG. 10, the computing device may be configured to apply the transform W to the feature vectors $o_t$ as shown by equation [10] to determine transformed feature vectors $\hat{o}_t$.

Referring back to FIG. 9, at block 906, the method 900 includes processing, by the computing device, the transformed audio signal using a neural network trained to estimate a given speech content of the audio signal. As shown in FIG. 10, at block 1008, the computing device may be configured to adapt the transformed feature vectors $\hat{o}_t$ to determine corresponding features that can be processed by a neural network. For instance, the computing device may be configured to adapt the transformed feature vectors $\hat{o}_t$ to match time step of the neural network. In this manner, the transformed feature vectors $\hat{o}_t$ may be adapted to correspond to the time sequence of feature vectors 301 in FIG. 3, for example.

The computing device may be configured to process the transformed vectors $\hat{o}_t$ (after adaptation at block 1008) through a neural network, such as Deep Neural Network (DNN) 1010. The DNN 1010 may correspond, for example, to the neural network 302 in FIG. 3 or the neural network 404 in FIG. 4.

The DNN 1010 may be trained to predict targets of context dependent (CD) HMM states. For each observation vector of and CD-HMM state $s_j$, the posterior probability $P(o_t'|s_j)$ is computed with the DNN 1010 and then converted to state emission likelihood:

$$P_{dnn}(o_t'|s_j) = \frac{P(s_j|o_t')}{P(s_j)} \cdot p(o_t') \quad [11]$$

where $s_j$ is the j-th HMM state, and observation vectors of are acoustic feature vectors augmented with neighbor frames. $P(s_j)$ is the prior probability of state $s_j$, which can be estimated from the frequency of the state in training alignments. In one example, in a likelihood computation, $P(o_t')$ is a constant that is independent of state $s_j$, and can thus be ignored in a likelihood computation. In other examples, the likelihood computation is not ignored.

In some examples, in addition to processing the transformed feature vectors $\hat{o}_t$ through a neural network, the computing device may be configured to process the transformed feature vectors $\hat{o}_t$, in parallel, using a GMM. As shown in FIG. 10, at block 1012, the computing device may be configured to adapt the transformed feature vectors $\hat{o}_t$ to determine corresponding features that can be processed by the GMM. For instance, the computing device may be configured to adapt the transformed feature vectors $\hat{o}_t$ to match time step of the GMM. In this manner, the transformed feature vectors $\hat{o}_t$ may be adapted to correspond to the time sequence of feature vectors 501 in FIG. 5, for example.

The computing device may be configured to process the transformed vectors $\hat{o}_t$ (after adaptation at block 1012) through GMM 1014. The GMM 1014 may correspond, for example, to the GMM 502 in FIG. 5 or the GMM 604 in FIG. 6. For instance, for an acoustic state $s_j$ with M multivariate Gaussian densities, state emission likelihoods may be determined as:

$$P_{gmm}(o_t|s_j) = \Sigma_{m=1}^{M} w_{jm} N(o_t; \mu_{jm}, \Sigma_{jm}) \quad [12]$$

Where $w_{jm}$ is a mixture weight of m-th Gaussian component in state $s_j$, $\mu_{jm}$ is a mean vector, $\Sigma_{jm}$ is covariance, and $N(.; \mu, \Sigma)$ denotes a Gaussian density with mean $\mu$ and covariance $\Sigma$.

Thus, both the DNN and GMM models may share the same transformed feature vectors $\hat{o}_t$. In this case, the DNN and GMM may be trained from the same type of source features. For example, both models can be trained using perceptual linear predictive (PLP) features.

Phone classification error patterns for DNN 1010 and GMM 1014 may be different, and combining outputs of DNN 1010 and GMM 1014 may achieve improved classification and ASR performance. The computing device may be configured to combine the outputs at the state level for every frame. The computing device may be configured to determine DNN scores at block 1016A and GMM score at block 1016B in FIG. 10, and determine at block 1018 a final acoustic score for frame t and state $s_j$ as a linear combination of DNN and GMM acoustic scores:

$$\log \hat{p}(o_t, o_t'|s_j) = \alpha_j \log p_{dnn}(o_t'|s_j) + (1-\alpha_j) \log p_{gmm}(o_t|s_j) \quad [13]$$

The parameter $\alpha_j$ is a state-dependent weight of DNN log likelihood score may be given a value between 0 and 1. In some examples, the state-dependent weights may be learned by minimizing a discriminative criterion such as phone or state classification error rate. In other examples, the weight $\alpha_j$ can be optimized by grid search on a development set.

Referring back to FIG. 9, at blocks 908, the method 900 includes modifying the speaker-specific feature transform based on an output of the neural network to obtain a modified speaker-specific feature transform, and at block 910 the method 900 includes applying the modified speaker-specific feature transform to a subsequent audio signal of the audio signals to obtain a respective transformed audio signal to be processed by the neural network to estimate a respective speech content of the subsequent audio signal. For example, the computing device may be configured to use alignments resulting from the decoder 1018 to accumulate sufficient statistics specific to a speaker of the input audio signal. The alignments contain information related to probability of each Gaussian in each frame. Therefore, statistics can be accumulated for all Gaussians. Then, the speaker-specific feature transform is re-estimated (or modified) at block 1004 based on the accumulated statistics and the feature vectors obtained from block 1002 to maximize the likelihood.

As an example for illustration, the computing device may be configured to receive, over time, three consecutive audio signals, each audio signal having respective speech content from a given speaker. With reference to FIG. 10, the computing device may be configured to extract, at block 1002, feature vectors from the first audio signal and apply, at block 1006, a transform W to the feature vectors. The transform W may be initialized to an identity matrix, for example, or may initially be determined using speaker-specific characteristics to which the computing device may have access. The transformed feature vectors may be adapted to be processed by both the DNN 1010 and the GMM 1014. The outputs of the DNN 1010 and the GMM 1014 are merged at block 1014 and decoded by the decoder 1018 to determine hypotheses or estimated respective speech content of the first audio signal.

The hypotheses, alignments, or the estimated respective speech content are feedback to the GMM fMLLR block 1004 to modify the transform W. The modified transform W may also be modified (or re-estimated) based on feature vectors extracted from the subsequent audio signal, i.e., the second audio signal. The modified transform W is thus adapted to characteristics of the speaker by integrating parameters of the estimated speech of the speaker. The modified transform W may then be applied to respective feature vectors extracted from the second audio signal. Upon processing the respective feature vectors of the second audio signal to determine the respective speech content, the transform W is modified again using respective outputs of the decoding process. Similarly, the transform W modified by outputs associated with the first audio signal and outputs associated with the second audio signal is applied to respective feature vectors of the third audio signal. This process is continued such that the transform W is modified sequentially or incrementally upon processing each audio signal. Additionally, the computing device may be configured to continuously update the speaker-specific characteristics based on outputs of the decoding process, for example.

The system 1000 may be configured to run in real-time. In examples, the system 1000 may be implemented using multi-core central processing units, and the DNN 1010 and GMM 1014 may be implemented on separate threads to improve computational efficiency. Components of the system 1000 may be configured to work in an interconnected fashion with each other and/or with other components coupled to respective systems. One or more of the described functions or components of the system 1000 may be divided up into additional functional or physical components, or combined into fewer functional or physical components. In some further examples, additional functional and/or physical components may be added to the examples illustrated by FIG. 10. The system 1000 may include or be provided in the form of a processor (e.g., a microprocessor, a digital signal processor (DSP), etc.) configured to execute program code including one or more instructions for implementing logical functions described at the various blocks of the system 1000. The system 1000 may further include any type of computer readable medium (non-transitory medium) or memory, for example, such as a storage device including a disk or hard drive, to store the program code. In other examples, the system 1000 may be included within other systems.

Figure 11:
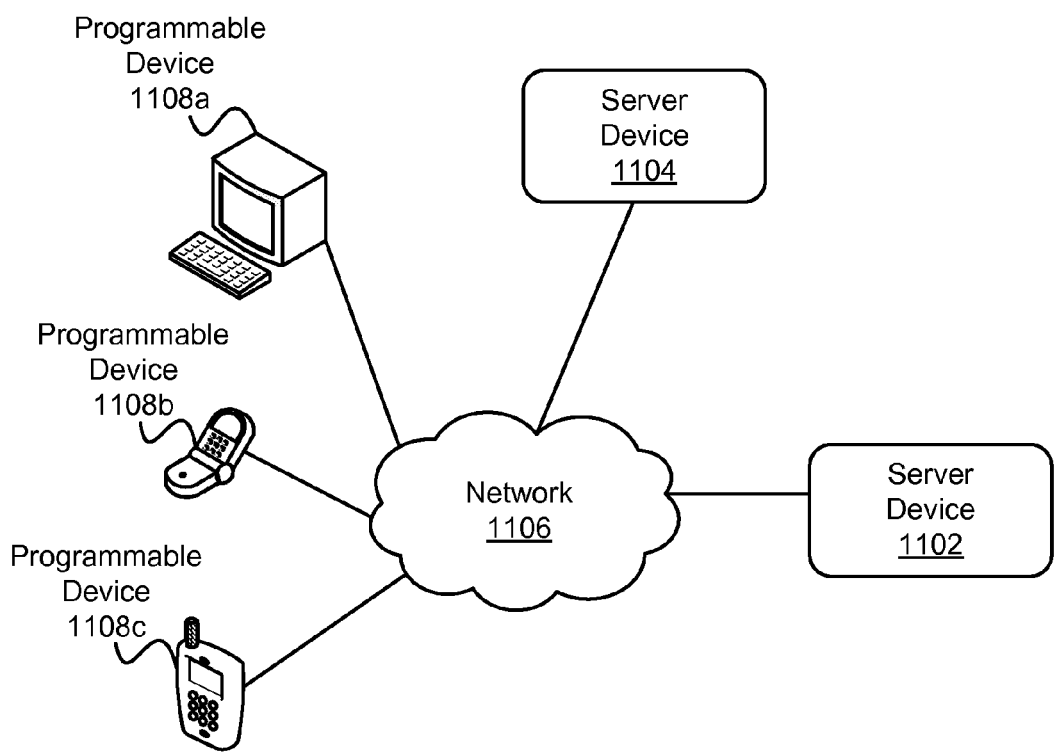
FIG. 11 illustrates an example distributed computing architecture, in accordance with an example embodiment.

IV. Example Communication System and Device Architecture for Supporting Automatic Speech Recognition FIG. 11 illustrates an example distributed computing architecture, in accordance with an example embodiment. FIG. 11 shows server devices 1102 and 1104 configured to communicate, via network 1106, with programmable devices 1108a, 1108b, and 1108c. The network 1106 may correspond to a LAN, a wide area network (WAN), a corporate intranet, the public Internet, or any other type of network configured to provide a communications path between networked computing devices. The network 1106 may also correspond to a combination of one or more LANs, WANs, corporate intranets, and/or the public Internet.

Although FIG. 11 shows three programmable devices, distributed application architectures may serve tens, hundreds, or thousands of programmable devices. Moreover, the programmable devices 1108a, 1108b, and 1108c (or any additional programmable devices) may be any sort of computing device, such as an ordinary laptop computer, desktop computer, network terminal, wireless communication device (e.g., a tablet, a cell phone or smart phone, a wearable computing device, etc.), and so on. In some examples, the programmable devices 1108a, 1108b, and 1108c may be dedicated to the design and use of software applications. In other examples, the programmable devices 1108a, 1108b, and 1108c may be general purpose computers that are configured to perform a number of tasks and may not be dedicated to software development tools.

The server devices 1102 and 1104 can be configured to perform one or more services, as requested by programmable devices 1108a, 1108b, and/or 1108c. For example, server device 1102 and/or 1104 can provide content to the programmable devices 1108a-1108c. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, the server device 1102 and/or 1104 can provide the programmable devices 1108a-1108c with access to software for database, search, computation, graphical, audio (e.g. speech recognition), video, World Wide Web/Internet utilization, and/or other functions. Many other examples of server devices are possible as well.

The server devices 1102 and/or 1104 can be cloud-based devices that store program logic and/or data of cloud-based applications and/or services. In some examples, the server devices 1102 and/or 1104 can be a single computing device residing in a single computing center. In other examples, the server device 1102 and/or 1104 can include multiple computing devices in a single computing center, or multiple computing devices located in multiple computing centers in diverse geographic locations. For example, FIG. 11 depicts each of the server devices 1102 and 1104 residing in different physical locations.

In some examples, data and services at the server devices 1102 and/or 1104 can be encoded as computer readable information stored in non-transitory, tangible computer readable media (or computer readable storage media) and accessible by programmable devices 1108a, 1108b, and 1108c, and/or other computing devices. In some examples, data at the server device 1102 and/or 1104 can be stored on a single disk drive or other tangible storage media, or can be implemented on multiple disk drives or other tangible storage media located at one or more diverse geographic locations.

Figure 12A:
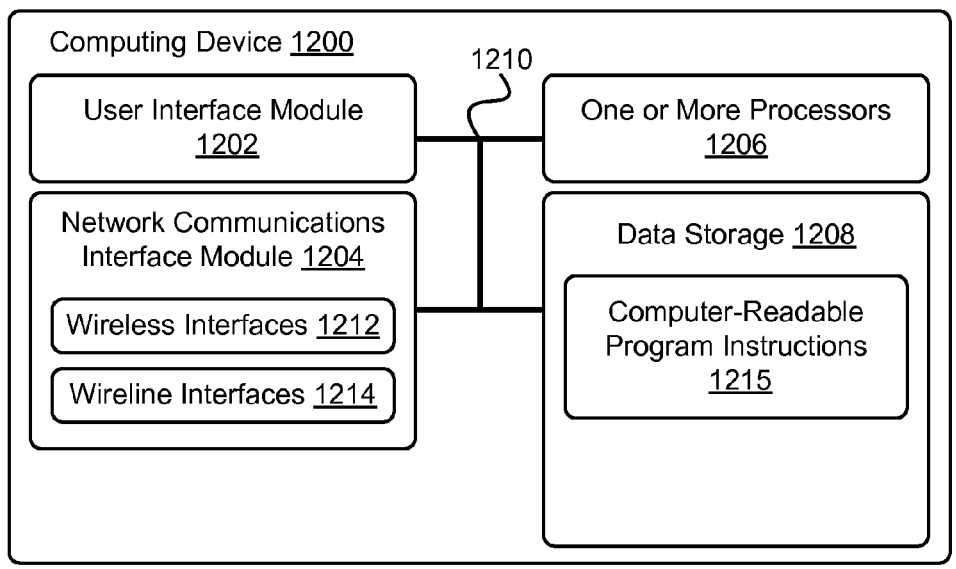
FIG. 12A is a block diagram of an example computing device, in accordance with an example embodiment illustrates.

FIG. 12A is a block diagram of a computing device (e.g., system) in accordance with an example embodiment. In particular, computing device 1200 shown in FIG. 12A can be configured to perform one or more functions of the server devices 1202, 1204, network 1206, and/or one or more of the programmable devices 1208a, 1208b, and 1208c. The computing device 1200 may include a user-interface module 1202, a network communications interface module 1204, one or more processors 1206, and data storage 1208, all of which may be linked together via a system bus, network, or other connection mechanism 1210.

The user-interface module 1202 can be operable to send data to and/or receive data from external user input/output devices. For example, user-interface module 1202 can be configured to send and/or receive data to and/or from user input devices such as a keyboard, a keypad, a touchscreen, a computer mouse, a track ball, a joystick, a camera, a voice recognition/synthesis module, and/or other similar devices. The user-interface module 1202 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. The user-interface module 1202 can also be configured to generate recognized speech or audible output(s), and may include a speaker, speaker jack, audio output port, audio output device, earphones, and/or other similar devices.

The network communications interface module 1204 can include one or more wireless interfaces 1212 and/or one or more wireline interfaces 1214 that are configurable to communicate via a network, such as network 1106 shown in FIG. 11. The wireless interfaces 1212 can include one or more wireless transmitters, receivers, and/or transceivers, such as a Bluetooth transceiver, a Zigbee transceiver, a Wi-Fi transceiver, a LTE transceiver, and/or other similar type of wireless transceiver configurable to communicate via a wireless network. The wireline interfaces 1214 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, the network communications interface module 1204 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

The processors 1206 can include one or more general purpose processors and/or one or more special purpose processors (e.g., digital signal processors, application specific integrated circuits, etc.). The processors 1206 can be configured to execute computer-readable program instructions 1215 that are contained in the data storage 1208 and/or other instructions as described herein (e.g., the method 900).

The data storage 1208 can include one or more computer-readable storage media that can be read and/or accessed by at least one of processors 1206. The one or more computer-readable storage media can include volatile and/or non-volatile storage components, such as optical, magnetic, organic or other memory or disc storage, which can be integrated in whole or in part with at least one of the processors 1206. In some examples, the data storage 1208 can be implemented using a single physical device (e.g., one optical, magnetic, organic or other memory or disc storage unit), while in other examples, the data storage 1208 can be implemented using two or more physical devices.

The data storage 1208 can include computer-readable program instructions 1215 and perhaps additional data, such as but not limited to data used by one or more processes and/or threads of a software application. In some examples, data storage 1208 can additionally include storage required to perform at least part of the herein-described methods (e.g., the method 900) and techniques and/or at least part of the functionality of the herein-described devices and networks.

Figure 12B:
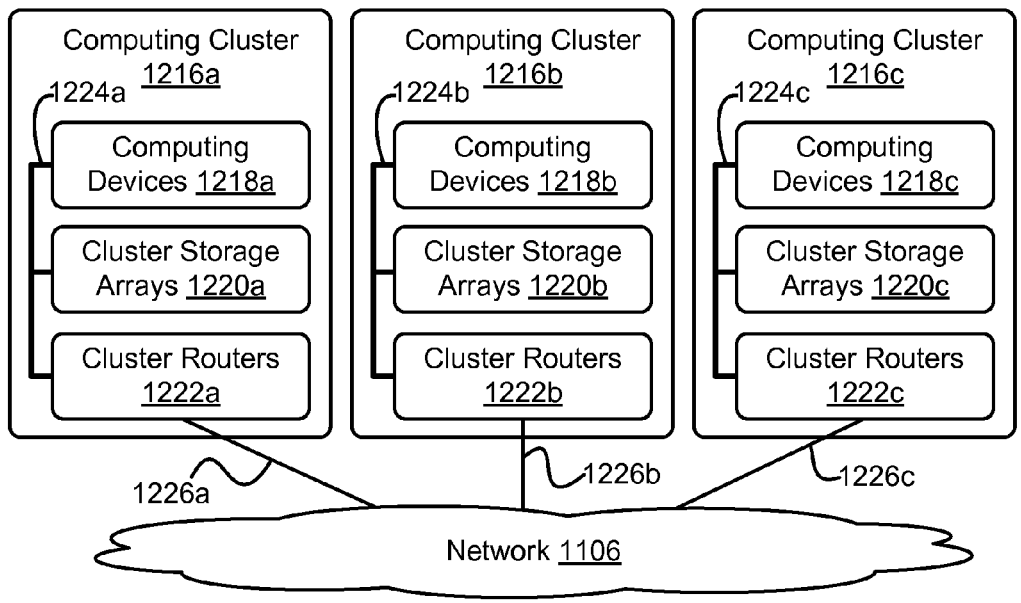
FIG. 12B illustrates a cloud-based server system, in accordance with an example embodiment.

FIG. 12B depicts a cloud-based server system, in accordance with an example embodiment. In FIG. 12B, functions of the server device 1102 and/or 1104 can be distributed among three computing clusters 1216a, 1216b, and 1216c. The computing cluster 1216a can include one or more computing devices 1218a, cluster storage arrays 1220a, and cluster routers 1222a connected by a local cluster network 1224a. Similarly, the computing cluster 1216b can include one or more computing devices 1218b, cluster storage arrays 1220b, and cluster routers 1222b connected by a local cluster network 1224b. Likewise, computing cluster 1216c can include one or more computing devices 1218c, cluster storage arrays 1220c, and cluster routers 1222c connected by a local cluster network 1224c.

In some examples, each of the computing clusters 1216a, 1216b, and 1216c can have an equal number of computing devices, an equal number of cluster storage arrays, and an equal number of cluster routers. In other examples, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In the computing cluster 1216a, for example, the computing devices 1218a can be configured to perform various computing tasks of the server device 1102. In one example, the various functionalities of the server device 1102 can be distributed among one or more of computing devices 1218a, 1218b, and 1218c. The computing devices 1218b and 1218c in the computing clusters 1216b and 1216c can be configured similarly to the computing devices 1218a in computing cluster 1216a. On the other hand, in some examples, the computing devices 1218a, 1218b, and 1218c can be configured to perform different functions.

In some examples, computing tasks and stored data associated with server devices 1102 and/or 1104 can be distributed across computing devices 1218*a*, 1218*b*, and 1218*c* based at least in part on the processing requirements of the server devices 1102 and/or 1104, the processing capabilities of computing devices 1218*a*, 1218*b*, and 1218*c*, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 1220*a*, 1220*b*, and 1220*c* of the computing clusters 1216*a*, 1216*b*, and 1216*c* can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of the server devices 1102 and/or 1104 can be distributed across computing devices 1218*a*, 1218*b*, and 1218*c* of computing clusters 1216*a*, 1216*b*, and 1216*c*, various active portions and/or backup portions of these components can be distributed across cluster storage arrays 1220*a*, 1220*b*, and 1220*c*. For example, some cluster storage arrays can be configured to store the data of the server device 1102, while other cluster storage arrays can store data of the server device 1104. Additionally, some cluster storage arrays can be configured to store backup versions of data stored in other cluster storage arrays.

The cluster routers 1222*a*, 1222*b*, and 1222*c* in computing clusters 1216*a*, 1216*b*, and 1216*c* can include networking equipment configured to provide internal and external communications for the computing clusters. For example, the cluster routers 1222*a* in computing cluster 1216*a* can include one or more internet switching and routing devices configured to provide (i) local area network communications between the computing devices 1218*a* and the cluster storage arrays 1220*a* via the local cluster network 1224*a*, and (ii) wide area network communications between the computing cluster 1216*a* and the computing clusters 1216*b* and 1216*c* via the wide area network connection 1226*a* to network 1206. The cluster routers 1222*b* and 1222*c* can include network equipment similar to the cluster routers 1222*a*, and the cluster routers 1222*b* and 1222*c* can perform similar networking functions for the computing clusters 1216*b* and 1216*c* that the cluster routers 1222*a* perform for the computing cluster 1216*a*.

In some examples, the configuration of the cluster routers 1222*a*, 1222*b*, and 1222*c* can be based at least in part on the data communication requirements of the computing devices and cluster storage arrays, the data communications capabilities of the network equipment in the cluster routers 1222*a*, 1222*b*, and 1222*c*, the latency and throughput of the local networks 1224*a*, 1224*b*, 1224*c*, the latency, throughput, and cost of wide area network links 1226*a*, 1226*b*, and 1226*c*, and/or other factors that can contribute to the cost, speed, fault-tolerance, resiliency, efficiency and/or other design goals of the moderation system architecture.

In examples, the configurations illustrated in FIGS. 11 and 12A-12B can be used for implementations described with respect to the method 900. For example, the computing device implementing the method 900 can be a cloud-based device (e.g., server devices 1102 and/or 1104), or one of the programmable devices 1108*a-c* in FIG. 11, or the computing devices 1218*a-c* of FIG. 12B. In some examples, a computing device, such as one of the programmable devices 1108*a-c* in FIG. 11, may be configured to sequentially receive the audio signals, and provide the audio signals or information associated with the audio signals to server devices 1102 and/or 1104. The server devices 1102 and/1104 may be configured to process the audio signals incrementally as described in FIGS. 8, 9, and 10. The server devices 1102 and/1104 may provide the estimate speech content back to the computing device (one of the programmable devices 1108*a-c* in FIG. 11), for example.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving, by a computing device, a sequence of consecutive audio signals, the sequence including a first audio signal at a first time and a second audio signal at a second time later than the first time, wherein the audio first signal and the second audio signal include speech content;
selecting, by the computing device, a speaker-specific profile based on speech characteristics determined from one or more of the audio signals of the sequence;
applying a speaker-specific feature transform to the first audio signal to obtain a transformed audio signal, wherein the speaker-specific feature transform is determined based on one or more speaker-specific speech characteristics of the selected speaker-profile;
processing, by the computing device, the transformed audio signal using a neural network trained to estimate a given speech content of the first audio signal;
modifying the speaker-specific feature transform based on an output of the neural network to obtain a modified speaker-specific feature transform; and
applying the modified speaker-specific feature transform to the second audio signal to obtain a respective transformed audio signal to be processed by the neural network to estimate a respective speech content of the second audio signal.

2. The method of claim 1, further comprising:
determining, for the first audio signal, one or more feature vectors, wherein a respective feature vector of the one or more feature vectors includes a respective quantitative measure of a respective acoustic property of the first audio signal,
wherein applying the speaker-specific feature transform to the first audio signal comprises applying the speaker-specific feature transform to the one or more feature vectors to obtain one or more transformed feature vectors, and
wherein processing the transformed audio signal using the neural network to estimate the given speech content of the first audio signal comprises processing the one or more transformed feature vectors.

3. The method of claim 2, wherein the respective quantitative measure of the respective acoustic property includes at least one of Mel Filter Cepstral coefficients, Perceptual Linear Predictive coefficients, Relative Spectral coefficients, or Filterbank log-energy coefficients.

4. The method of claim 1, wherein modifying the speaker-specific feature transform comprises:
processing the one or more speaker-specific speech characteristics and the output of the neural network by a Gaussian Mixture Model implemented by the computing device to determine the modified speaker-specific feature transform.

5. The method of claim 1, wherein processing the transformed audio signal by the neural network comprises processing the transformed audio signal by the neural network to generate a neural network-based set of emission likelihoods for a plurality of hidden Markov models implemented by the computing device.

6. The method of claim 5, further comprising:
processing the transformed audio signal with a Gaussian mixture model implemented by the computing device to generate a Gaussian mixture model-based set of emission likelihoods for the plurality of hidden Markov models; and
merging the neural network-based set of emission likelihoods with the Gaussian mixture model-based set of emission likelihoods to generate a merged set of emission likelihoods for the plurality of hidden Markov models,
applying the merged set of emission likelihoods to the plurality of hidden Markov models to estimate the given speech content of the first audio signal.

7. The method of claim 1, further comprising:
determining, for the first audio signal, one or more feature vectors, wherein a respective feature vector of the one or more feature vectors includes a respective quantitative measure of a respective acoustic property of the first audio signal, and wherein applying the speaker-specific feature transform to the first audio signal comprises applying the speaker-specific feature transform to the one or more feature vectors to obtain one or more transformed feature vectors; and
processing the one or more transformed feature vectors with a Gaussian mixture model implemented by the computing device to generate a Gaussian mixture model-based set of emission likelihoods for a plurality of hidden Markov models, wherein the plurality of hidden Markov models comprises a multiplicity of states, and wherein processing the one or more transformed feature vectors with the Gaussian mixture model comprises:
for each respective transformed feature vector, determining, for each respective state of the multiplicity of states, a respective Gaussian mixture model-based conditional likelihood of emitting the respective transformed feature vector given the respective state.

8. The method of claim 1, further comprising:
determining, for the first audio signal, one or more feature vectors, wherein a respective feature vector of the one or more feature vectors includes a respective quantitative measure of a respective acoustic property of the first audio signal, wherein applying the speaker-specific feature transform to the first audio signal comprises applying the speaker-specific feature transform to the one or more feature vectors to obtain one or more transformed feature vectors,
wherein processing the transformed audio signal using the neural network comprises processing the one or more transformed feature vectors to generate neural network-based set of emission likelihoods for the plurality of hidden Markov models, and wherein processing the one or more transformed feature vectors by the neural network comprises:
for each respective transformed feature vector of the one or more transformed feature vectors, determining, for each respective state of the multiplicity of states, a respective neural network-based conditional likelihood of emitting the respective transformed feature vector given the respective state.

9. The method of claim 1, wherein processing the transformed audio signal using the neural network comprises processing the transformed audio signal by the neural network to generate neural network-based set of emission likelihoods for a plurality of hidden Markov models, wherein the plurality of hidden Markov models comprises a multiplicity of states,
wherein each of the hidden Markov models in the plurality is associated with a respective elemental speech unit, and has one or more states corresponding to one or more temporal phases of the associated respective elemental speech unit,
wherein the multiplicity of states comprises a collection of the one or more states of each of the hidden Markov models in the plurality,
and wherein determining the given speech content of the first audio signal comprises determining a probable sequence of elemental speech units based on a most likely sequence of states of the multiplicity.

10. The method of claim 9, wherein each elemental speech unit is at least one of a phoneme, a triphone, or a quinphone.

11. The method of claim 1, further comprising estimating the given speech content, wherein estimating the given speech content comprises at least one of:
generating a text string transcription corresponding to the given speech content, or
identifying a computer-executable command based on the given speech content.

12. The method of claim 1, wherein modifying the speaker-specific feature transform based on the output of the neural network comprises modifying speaker-specific feature transform in real-time.

13. The method of claim 1, further comprising:
updating the one or more speaker-specific speech characteristics based on the output of the neural network.

14. A non-transitory computer readable storage medium having stored therein instructions, that when executed by a computing device, cause the computing device to perform functions comprising:
receiving a sequence of consecutive audio signals, the sequence including first audio signal at a first time and a second audio signal at a second time later than the first time, wherein the first audio signal and the second audio signal include speech content;
selecting a speaker-specific profile based on speech characteristics determined from one or more of the audio signals of the sequence;
applying a speaker-specific feature transform to the first audio signal to obtain a transformed audio signal, wherein the speaker-specific feature transform is determined based on one or more speaker-specific speech characteristics of the selected speaker-profile;
processing the transformed audio signal using a neural network trained to estimate a given speech content of the first audio signal;

modifying the speaker-specific feature transform based on an output of the neural network to obtain a modified speaker-specific feature transform; and applying the modified speaker-specific feature transform to the second audio signal to obtain a respective transformed audio signal to be processed by the neural network to estimate a respective speech content of the second audio signal.

15. The non-transitory computer readable storage medium of claim 14, wherein the function of modifying the speaker-specific feature transform comprises:

processing the one or more speaker-specific speech characteristics and the output of the neural network by a Gaussian mixture model to determine the modified speaker-specific feature transform.

16. The non-transitory computer readable storage medium of claim 14, wherein the function of processing the transformed audio signal using the neural network trained to estimate the given speech content of the first audio signal comprises processing the transformed audio signal in real-time.

17. The non-transitory computer readable storage medium of claim 14, wherein the functions further comprise estimating the given speech content, wherein the function of estimating the given speech content comprises at least one of:

generating a text string transcription corresponding to the given speech content, or identifying a computer-executable command based on the given speech content.

18. A system comprising:

at least one processor; and data storage comprising instructions executable by the at least one processor to cause the system to perform functions comprising:

receiving a sequence of consecutive audio signals, the sequence including a first audio signal at a first time and a second audio signal at a second time later than the first time, wherein the first audio signal and the second audio signal include speech content;

selecting a speaker-specific profile based on speech characteristics determined from one or more of the audio signals of the sequence;

applying a speaker-specific feature transform to the first audio signal to obtain a transformed audio signal, wherein the speaker-specific feature transform is determined based on one or more speaker-specific speech characteristics of the selected speaker-profile;

processing the transformed audio signal using a neural network trained to estimate a given speech content of the first audio signal;

modifying the speaker-specific feature transform based on an output of the neural network to obtain a modified speaker-specific feature transform; and applying the modified speaker-specific feature transform to the second audio signal to obtain a respective transformed audio signal to be processed by the neural network to estimate a respective speech content of the second audio signal.

19. The system of claim 18, wherein the functions further comprise:

determining, for the first audio signal, one or more feature vectors, wherein each respective feature vector of the one or more feature vectors includes a respective quantitative measure of a respective acoustic property of the first audio signal, wherein the respective quantitative measure of the respective acoustic property includes at least one of Mel Filter Cepstral coefficients, Perceptual Linear Predictive coefficients, Relative Spectral coefficients, or Filterbank log-energy coefficients, wherein the function of applying the speaker-specific feature transform to the first audio signal comprises applying the speaker-specific feature transform to the one or more feature vectors to obtain one or more feature transformed vectors, and wherein the function of processing the transformed audio signal using the neural network to estimate the given speech content of the first audio signal comprises processing the one or more transformed feature vectors.

20. The system of claim 18, wherein the functions further comprise:

updating, in real-time, the one or more speaker-specific speech characteristics based on the outputs of the neural network.

* * * * *